United States Patent
Krishnan et al.

(10) Patent No.: US 12,375,902 B2
(45) Date of Patent: Jul. 29, 2025

(54) NETWORK COORDINATION DURING PATH SWITCHING AND MULTI-PATH SCENARIOS

(71) Applicant: QUALCOMM Incorporated, San Diego, CA (US)

(72) Inventors: Shankar Krishnan, San Diego, CA (US); Karthika Paladugu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 17/731,539

(22) Filed: Apr. 28, 2022

(65) Prior Publication Data

US 2023/0354012 A1  Nov. 2, 2023

(51) Int. Cl.
*H04W 8/26* (2009.01)
*H04L 45/24* (2022.01)
(Continued)

(52) U.S. Cl.
CPC .............. *H04W 8/26* (2013.01); *H04L 45/24* (2013.01); *H04W 24/10* (2013.01); *H04W 72/30* (2023.01); *H04W 76/14* (2018.02); *H04W 88/04* (2013.01)

(58) Field of Classification Search
CPC ....... H04W 8/26; H04W 24/10; H04W 72/30; H04W 76/14; H04W 88/04; H04W 36/033; H04W 88/12; H04W 92/20; H04L 45/24
See application file for complete search history.

(56) References Cited

U.S. PATENT DOCUMENTS

2016/0212780 A1* 7/2016 Stojanovski .......... H04W 8/005
2020/0137644 A1* 4/2020 Yeh ........................ H04W 76/19
(Continued)

FOREIGN PATENT DOCUMENTS

WO  WO-2018059126 A1  4/2018
WO  WO-2021175162 A1  9/2021
(Continued)

OTHER PUBLICATIONS

International Search Report and Written Opinion—PCT/US2023/065781—ISA/EPO—Aug. 3, 2023.
(Continued)

*Primary Examiner* — Kan Yuen
(74) *Attorney, Agent, or Firm* — Holland & Hart LLP

(57) ABSTRACT

Methods, systems, and devices for wireless communications supporting network coordination during path switching and multi-path scenarios are described. For example, a first network entity may receive, from a first user equipment (UE), a measurement report indicating a degradation of communications between the first UE and the first network entity. The first network entity may transmit, to a second network entity, a request message to switch a connection between the first UE and the first network entity to a connection between the first UE and the second network entity. The second network entity may transmit, to the first network entity, an acknowledgment based on the request. The first network entity may configure the first UE for the new connection and the second network entity may configure the second UE for the new connection. The first UE may communicate with the second network entity via the second UE.

16 Claims, 14 Drawing Sheets

(51) Int. Cl.
*H04W 24/10* (2009.01)
*H04W 72/30* (2023.01)
*H04W 76/14* (2018.01)
*H04W 88/04* (2009.01)

(56) References Cited

U.S. PATENT DOCUMENTS

| | | | | |
|---|---|---|---|---|
| 2023/0189101 | A1* | 6/2023 | Bi | H04W 36/033 370/331 |
| 2023/0247513 | A1* | 8/2023 | Paladugu | H04W 36/033 370/315 |
| 2023/0262552 | A1* | 8/2023 | Cui | H04W 36/023 370/331 |
| 2023/0276313 | A1* | 8/2023 | Wu | H04W 36/033 370/331 |
| 2023/0363020 | A1* | 11/2023 | Back | H04W 36/324 |
| 2023/0413351 | A1* | 12/2023 | Wu | H04W 76/10 |
| 2024/0040445 | A1* | 2/2024 | Sabouri-Sichani | H04W 36/0058 |
| 2024/0306059 | A1* | 9/2024 | Zhang | H04W 36/0061 |
| 2024/0340731 | A1* | 10/2024 | Back | H04W 36/0058 |
| 2024/0349148 | A1* | 10/2024 | Yang | H04W 92/18 |
| 2024/0357451 | A1* | 10/2024 | Pan | H04W 36/0016 |

FOREIGN PATENT DOCUMENTS

| | | |
|---|---|---|
| WO | WO-2021195647 A2 | 9/2021 |
| WO | WO-2022002080 A1 | 1/2022 |

OTHER PUBLICATIONS

QUALCOMM Inc: "Service Continuity Enhancements for L2 U2N Relays", 3GPP TSG-RAN WG3 Meeting #117-e, R3-224601, 3rd Generation Partnership Project (3GPP), Mobile Competence Centre, 650, Route Des Lucioles, F-06921 Sophia-Antipolis Cedex, France vol. RAN WG3, No. E-Meeting, Aug. 15, 2022-Aug. 24, 2022, Aug. 9, 2022,6 Pages, XP052264767, Clause 2.3 with reference to Fig. 1.

QUALCOMM Incorporated: "Remaining Issues on Service Continuity of L2 U2n Relay", 3GPP TSG RAN WG2 Meeting #117-e, R2-2202185, 3rd Generation Partnership Project (3GPP), Mobile Competence Centre, 650, Route Des Lucioles, F-06921 Sophia-Antipolis Cedex, France vol. RAN WG2, No. E-Conference, Feb. 21, 2022-Mar. 3, 2022, Feb. 14, 2022, 8 Pages, XP052110225, Clause 2.4 with reference to Figs. 1-3.

* cited by examiner

NETWORK COORDINATION DURING PATH SWITCHING AND MULTI-PATH SCENARIOS

FIELD OF TECHNOLOGY

The following relates to wireless communications, including network coordination during path switching and multi-path scenarios.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support network coordination during path switching and multi-path scenarios. Generally, the described techniques provide for a first network entity, associated with a first central unit (CU) and communicating with a first UE, to switch a connection between the first UE and the first network entity to a connection between the first UE and a second network entity, associated with a second CU. For example, the first network entity may receive, from the first UE, a first message including a measurement report indicating that communications between the first UE and the first network entity are degraded. The first network entity may receive the measurement report and may transmit, to the second network entity, a second message (e.g., a request message) for switching a connection between the first UE and the first network entity to a connection between the first UE and the second network entity. The second message may indicate a set of identifiers, including a first identifier associated with the first UE and a second identifier associated with a second UE. The second network entity may receive the request and assign a third identifier to the first UE. In some cases, the second network entity may select the second UE from a set of UEs associated with the set of identifiers. The second network entity may transmit, to the first network entity, a third message (e.g., an acknowledgment message) indicating the first identifier associated with the first UE, the second identifier associated with the second UE, and a third identifier associated with the first UE. In some cases, the second network entity may transmit, to the second UE, a fourth message (e.g., a configuration message) indicating the first identifier associated with the first UE and the third identifier associated with the first UE. Additionally, the first network entity may transmit, to the first UE, a fifth message (e.g., a configuration message) indicating the third identifier associated with the first UE and the second identifier associated with the second UE. Upon configuring the first UE and the second UE, the second network entity may communicate with the first UE via the second UE.

A method for wireless communications at a first network entity is described. The method may include receiving, from a first UE, a first message including a measurement report indicating a degradation of communications between the first UE and the first network entity, transmitting, to a second network entity, a second message for switching a connection between the first UE and the first network entity to a connection between the first UE and the second network entity based on receiving the measurement report indicating the degradation of communications, the second message indicating a set of identifiers including at least a first identifier associated with the first UE and a second identifier associated with a second UE, where the first network entity is associated with a first CU and the second network entity is associated with a second CU different from the first CU, and transmitting, to the first UE, a third message indicating a third identifier associated with the first UE and the second identifier associated with the second UE, where the third identifier associated with the first UE is based on an assignment of the first UE at the second network entity, the assignment of the third identifier to the first UE being in accordance with a relay connection establishment between the first UE, the second UE, and the second network entity as part of the switching the connection between the first UE and the first network entity to the connection between the first UE and the second network entity.

An apparatus for wireless communications at a first network entity is described. The apparatus may include a processor, memory coupled with the processor, and instructions stored in the memory. The instructions may be executable by the processor to cause the apparatus to receive, from a first UE, a first message including a measurement report indicating a degradation of communications between the first UE and the first network entity, transmit, to a second network entity, a second message for switching a connection between the first UE and the first network entity to a connection between the first UE and the second network entity based on receiving the measurement report indicating the degradation of communications, the second message indicating a set of identifiers including at least a first identifier associated with the first UE and a second identifier associated with a second UE, where the first network entity is associated with a first CU and the second network entity is associated with a second CU different from the first CU, and transmit, to the first UE, a third message indicating a third identifier associated with the first UE and the second identifier associated with the second UE, where the third identifier associated with the first UE is based on an assignment of the first UE at the second network entity, the assignment of the third identifier to the first UE being in accordance with a relay connection establishment between the first UE, the second UE, and the second network entity as part of the switching the connection between the first UE and the first network entity to the connection between the first UE and the second network entity.

Another apparatus for wireless communications at a first network entity is described. The apparatus may include means for receiving, from a first UE, a first message including a measurement report indicating a degradation of communications between the first UE and the first network entity, means for transmitting, to a second network entity, a second message for switching a connection between the first UE and the first network entity to a connection between the first UE and the second network entity based on receiving the measurement report indicating the degradation of communications, the second message indicating a set of identifiers including at least a first identifier associated with the first UE and a second identifier associated with a second UE, where the first network entity is associated with a first CU and the second network entity is associated with a second CU different from the first CU, and means for transmitting, to the first UE, a third message indicating a third identifier associated with the first UE and the second identifier associated with the second UE, where the third identifier associated with the first UE is based on an assignment of the first UE at the second network entity, the assignment of the third identifier to the first UE being in accordance with a relay connection establishment between the first UE, the second UE, and the second network entity as part of the switching the connection between the first UE and the first network entity to the connection between the first UE and the second network entity.

A non-transitory computer-readable medium storing code for wireless communications at a first network entity is described. The code may include instructions executable by a processor to receive, from a first UE, a first message including a measurement report indicating a degradation of communications between the first UE and the first network entity, transmit, to a second network entity, a second message for switching a connection between the first UE and the first network entity to a connection between the first UE and the second network entity based on receiving the measurement report indicating the degradation of communications, the second message indicating a set of identifiers including at least a first identifier associated with the first UE and a second identifier associated with a second UE, where the first network entity is associated with a first CU and the second network entity is associated with a second CU different from the first CU, and transmit, to the first UE, a third message indicating a third identifier associated with the first UE and the second identifier associated with the second UE, where the third identifier associated with the first UE is based on an assignment of the first UE at the second network entity, the assignment of the third identifier to the first UE being in accordance with a relay connection establishment between the first UE, the second UE, and the second network entity as part of the switching the connection between the first UE and the first network entity to the connection between the first UE and the second network entity.

Some examples of the method, apparatuses, and non-transitory computer-readable medium described herein may further include operations, features, means, or instructions for receiving, from the second network entity and in response to transmitting the second message, a fourth message acknowledging the second message, the fourth message indicating the first identifier associated with the first UE, the second identifier associated with the second UE, and the third identifier associated with the first UE.

In some examples of the method, apparatuses, and non-transitory computer-readable medium described herein, receiving the fourth message may include operations, features, means, or instructions for receiving an indication of sidelink control group resources associated with the relay connection between the first UE, the second UE, and the second network entity, where the third message includes the indication of the sidelink control group resources.

In some examples of the method, apparatuses, and non-transitory computer-readable medium described herein, receiving the first message including the measurement report may include operations, features, means, or instructions for receiving the first message from the first UE via a third UE, where switching the connection between the first UE and the first network entity to the connection between the first UE and the second network entity includes switching a second relay connection between the first UE, the third UE, and the first network entity to the relay connection between the first UE, the second UE, and the second network entity.

In some examples of the method, apparatuses, and non-transitory computer-readable medium described herein, receiving the first message may include operations, features, means, or instructions for receiving an indication of the set of identifiers associated with a set of multiple UEs, where the set of multiple UEs may be associated with respective candidate relay connections between the first UE and the second network entity.

Some examples of the method, apparatuses, and non-transitory computer-readable medium described herein may further include operations, features, means, or instructions for transmitting, to the second network entity, a fourth identifier associated with the first UE, where the fourth identifier associated with the first UE may be based on updating the first identifier associated with the first UE.

In some examples of the method, apparatuses, and non-transitory computer-readable medium described herein, the first network entity includes a source network node for a handover operation and the second network entity includes a target network node for the handover operation.

A method for wireless communications at a second network entity is described. The method may include receiving, from a first network entity, a first message for switching a connection between a first UE and the first network entity to a connection between the first UE and the second network entity, the first message indicating a set of identifiers including at least a first identifier associated with the first UE and a second identifier associated with a second UE, where the first network entity is associated with a first CU and the second network entity is associated with a second CU different from the first CU, transmitting, to the first network entity, a second message indicating the first identifier associated with the first UE, the second identifier associated with the second UE, and a third identifier associated with the first UE, where the third identifier associated with the first UE is based on an assignment of the first UE at the second network entity, the assignment of the third identifier to the first UE being in accordance with a relay connection establishment between the first UE, the second UE, and the second network entity as part of the switching the connection between the first UE and the first network entity to the connection between the first UE and the second network entity, and communicating with the first UE via the second UE based on transmitting the second message.

An apparatus for wireless communications at a second network entity is described. The apparatus may include a processor, memory coupled with the processor, and instructions stored in the memory. The instructions may be executable by the processor to cause the apparatus to receive, from a first network entity, a first message for switching a connection between a first UE and the first network entity to a connection between the first UE and the second network entity, the first message indicating a set of identifiers including at least a first identifier associated with the first UE and a second identifier associated with a second UE, where the first network entity is associated with a first CU and the second network entity is associated with a second CU different from the first CU, transmit, to the first network entity, a second message indicating the first identifier associated with the first UE, the second identifier associated with the second UE, and a third identifier associated with the first UE, where the third identifier associated with the first UE is based on an assignment of the first UE at the second network entity, the assignment of the third identifier to the first UE being in accordance with a relay connection establishment between the first UE, the second UE, and the second network entity as part of the switching the connection between the first UE and the first network entity to the connection between the first UE and the second network entity, and communicate with the first UE via the second UE based on transmitting the second message.

Another apparatus for wireless communications at a second network entity is described. The apparatus may include means for receiving, from a first network entity, a first message for switching a connection between a first UE and the first network entity to a connection between the first UE and the second network entity, the first message indicating a set of identifiers including at least a first identifier associated with the first UE and a second identifier associated with a second UE, where the first network entity is associated with a first CU and the second network entity is associated with a second CU different from the first CU, means for transmitting, to the first network entity, a second message indicating the first identifier associated with the first UE, the second identifier associated with the second UE, and a third identifier associated with the first UE, where the third identifier associated with the first UE is based on an assignment of the first UE at the second network entity, the assignment of the third identifier to the first UE being in accordance with a relay connection establishment between the first UE, the second UE, and the second network entity as part of the switching the connection between the first UE and the first network entity to the connection between the first UE and the second network entity, and means for communicating with the first UE via the second UE based on transmitting the second message.

A non-transitory computer-readable medium storing code for wireless communications at a second network entity is described. The code may include instructions executable by a processor to receive, from a first network entity, a first message for switching a connection between a first UE and the first network entity to a connection between the first UE and the second network entity, the first message indicating a set of identifiers including at least a first identifier associated with the first UE and a second identifier associated with a second UE, where the first network entity is associated with a first CU and the second network entity is associated with a second CU different from the first CU, transmit, to the first network entity, a second message indicating the first identifier associated with the first UE, the second identifier associated with the second UE, and a third identifier associated with the first UE, where the third identifier associated with the first UE is based on an assignment of the first UE at the second network entity, the assignment of the third identifier to the first UE being in accordance with a relay connection establishment between the first UE, the second UE, and the second network entity as part of the switching the connection between the first UE and the first network entity to the connection between the first UE and the second network entity, and communicate with the first UE via the second UE based on transmitting the second message.

Some examples of the method, apparatuses, and non-transitory computer-readable medium described herein may further include operations, features, means, or instructions for selecting the second UE from a set of multiple UEs associated with the set of identifiers, where the set of multiple UEs may be associated with respective candidate relay connections between the first UE and the second network entity.

Some examples of the method, apparatuses, and non-transitory computer-readable medium described herein may further include operations, features, means, or instructions for transmitting, to the second UE, a third message indicating the first identifier associated with the first UE and the third identifier associated with the first UE, where establishing the relay connection between the first UE, the second UE, and the second network entity as part of the switching the connection between the first UE and the first network entity to the connection between the first UE and the second network entity may be based on the third message.

Some examples of the method, apparatuses, and non-transitory computer-readable medium described herein may further include operations, features, means, or instructions for receiving, from the second UE, a request for the third identifier associated with the first UE, where receiving the request may be based on the second UE being in an inactive mode or an idle mode.

Some examples of the method, apparatuses, and non-transitory computer-readable medium described herein may further include operations, features, means, or instructions for detecting an operational state of the second UE, where establishing the relay connection between the first UE, the second UE, and the second network entity as part of the switching the connection between the first UE and the first network entity to the connection between the first UE and the second network entity may be based on the operational state of the second UE.

In some examples of the method, apparatuses, and non-transitory computer-readable medium described herein, the operational state of the second UE may be associated with an active mode, an inactive mode, or an idle mode.

Some examples of the method, apparatuses, and non-transitory computer-readable medium described herein may further include operations, features, means, or instructions for receiving, from the first network entity, a fourth identifier associated with the first UE, where the fourth identifier associated with the first UE may be based on updating the first identifier associated with the first UE.

In some examples of the method, apparatuses, and non-transitory computer-readable medium described herein, transmitting the second message may include operations, features, means, or instructions for transmitting an indication of sidelink control group resources associated with the relay connection between the first UE, the second UE, and the second network entity.

DETAILED DESCRIPTION

Figure 1:
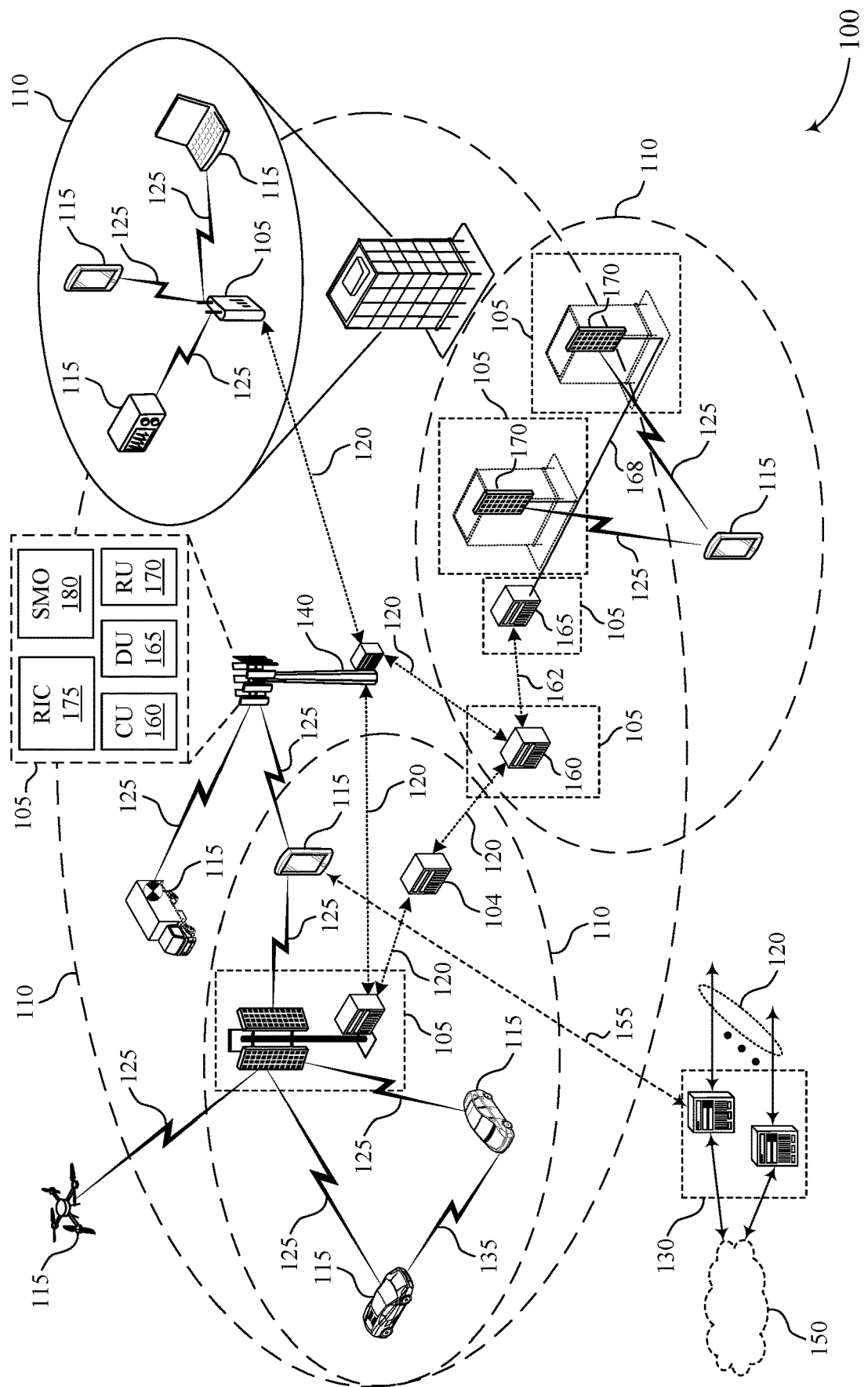
FIG. 1 illustrates an example of a wireless communications system that supports network coordination during path switching and multi-path scenarios in accordance with one or more aspects of the present disclosure.

Some wireless communications systems may support path switching. That is, a first network entity, such a source network entity, may communicate with a first user equipment (UE), such as a remote UE, via a direct path (e.g., without using a relay UE to relay communications between the first network entity to the first UE) or via an indirect path (e.g., using a relay UE to relay communications between the first network entity to the first UE). In some cases, communications between the remote UE and the source network entity may degrade, such that the source network entity may attempt to switch a connection between the remote UE and the source network entity to a connection between the first UE and a second network entity, such as a target network entity (e.g., inter-network entity path switching). Additionally, the connection between the first UE and the second network entity may include a second UE, such that the second UE may relay communications between the first UE and the second network entity (e.g., direct/indirect to indirect path switching). However, current techniques may be deficient for switching the connection between the remote UE and the source network entity to the connection between the first UE and the second network entity.

Similarly, some wireless communications systems may support path addition. That is, a remote UE may be connected to multiple network entities, such as a main network entity and a secondary network entity, via multiple paths, which may be direct paths or indirect paths. In some cases, communications between the remote UE and the main network entity may degrade, such that the main network entity may configure a path (e.g., add a path) for the remote UE to communication with the second network entity. For example, the main network entity may configure the remote UE to communicate with the second node indirectly via a relay UE (e.g., indirect path addition). However, current techniques may be deficient for some path addition scenarios.

Accordingly, aspects of the present disclosure may support techniques for network coordination during path switching and multi-path scenarios. For example, a first UE (e.g., a remote UE) may transmit, to a first network entity (e.g., a source or main network entity) a first message including a measurement report indicating a degradation of communications between the first UE and the first network entity. In some cases, the measurement report may include an indication of one or more UEs, including a second UE (e.g., a target UE), for relaying communications between the first UE and a second network entity. The first network entity may receive the first message and may transmit a request message (e.g., handover or path addition request) to the second network entity for switching a connection between the first UE and the first network entity to a connection between the first UE and the second network entity. The request message may include a set of identifiers, including at least a first identifier associated with the first UE (e.g., a remote UE Layer 2 (L2) identifier) and a second identifier associated with the second UE (e.g., a target UE L2 identifier).

The second network entity may receive the request message and may assign a third identifier to the first UE (e.g., a remote UE local identifier). In some cases, the second network entity may select the second UE from a set of UEs associated with the set of identifiers. Additionally, or alternatively, the second network entity may transmit an acknowledgment message indicating the first identifier associated with the first UE, the second identifier associated with the second UE, and the third identifier associated with the first UE. In some cases, the second network entity may transmit a first configuration message to the second UE indicating the first identifier associated with the first UE and the third identifier associated with the first UE, such that the second UE may establish a connection with the first UE. Additionally, the first network entity may transmit a second configuration message to the first UE indicating the third identifier associated with the first UE and the second identifier associated with the second UE, such that the first UE may establish a connection with the second UE. The second network entity may communicate with the first UE via the second UE based on the first and second configuration messages.

Aspects of the disclosure are initially described in the context of wireless communications systems. Aspects of the disclosure are then described in the context of a path switching procedure and a path addition procedure. Aspects of the disclosure are further illustrated by and described with reference to apparatus diagrams, system diagrams, and flowcharts that relate to network coordination during path switching and multi-path scenarios.

FIG. 1 illustrates an example of a wireless communications system 100 that supports network coordination during path switching and multi-path scenarios in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), L2) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support network coordination during path switching and multi-path scenarios as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The wireless communications system 100 may support techniques for network coordination during path switching and multi-path scenarios. For example, a first UE 115 may transmit, to a first network entity 105, a first message including a measurement report indicating a degradation of communications between the first UE 115 and the first network entity 105. The first network entity 105 may receive the first message and may transmit a request message to a second network entity 105 for switching a connection between the first UE 115 and the first network entity 105 to a connection between the first UE 115 and the second network entity 105. The request message may include a set of identifiers, including at least a first identifier associated with the first UE 115 and a second identifier associated with the second UE 115.

Additionally, the second network entity 105 may transmit an acknowledgment message indicating the first identifier associated with the first UE 115, the second identifier associated with the second UE 115, and a third identifier associated with the first UE 115, the third identifier assigned by the second network entity 105. The first network entity 105 may transmit a configuration message to the first UE 115 indicating the third identifier associated with the first UE 115 and the second identifier associated with the second UE 115, such that the first UE 115 may establish a connection with the second UE 115. Accordingly, the second network entity 105 may communicate with the first UE 115 via the second UE 115.

Figure 2:
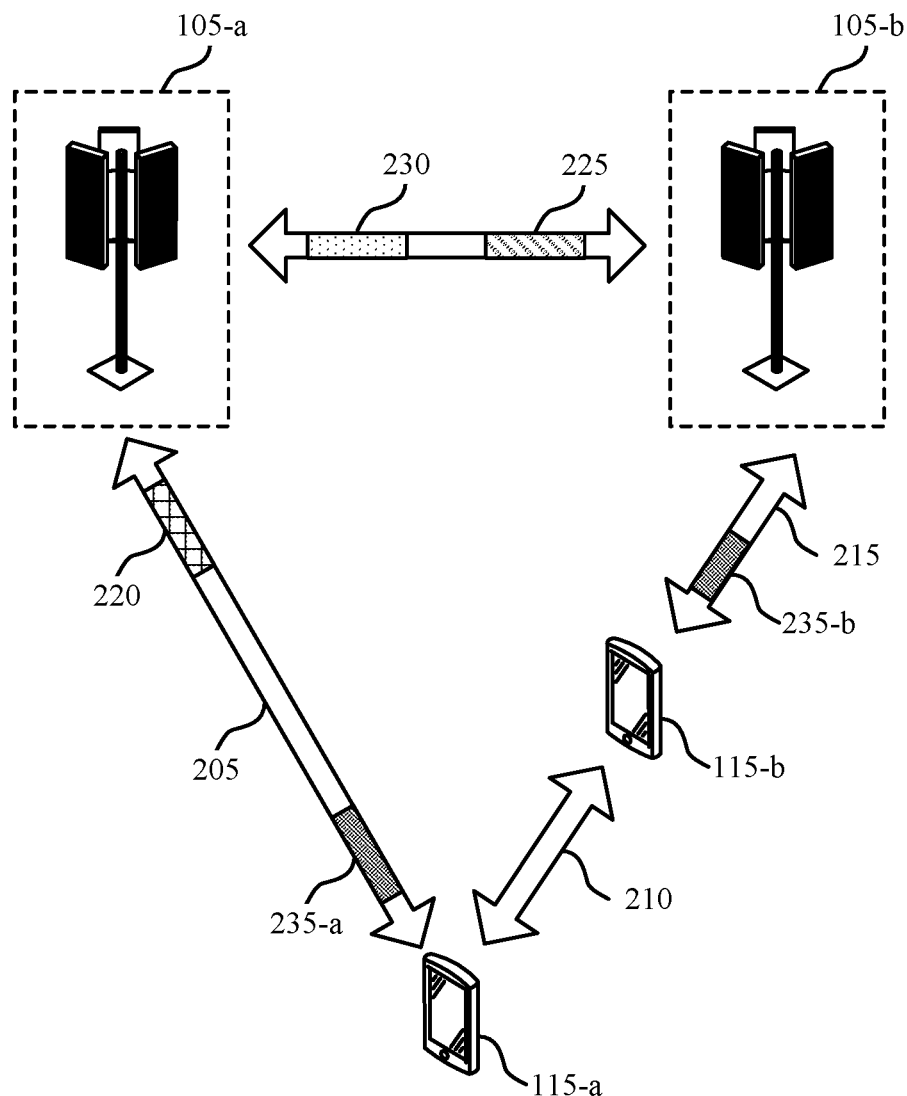
FIG. 2 illustrates an example of a wireless communications system that supports network coordination during path switching and multi-path scenarios in accordance with one or more aspects of the present disclosure.

FIG. 2 illustrates an example of a wireless communications system 200 that supports network coordination during path switching and multi-path scenarios in accordance with one or more aspects of the present disclosure. In some examples, the wireless communications system 200 may implement aspects of the wireless communications system 100. For example, the wireless communications system 200 may include one or more network entities 105 (e.g., a network entity 105-*a* and a network entity 105-*b*) and one or more UEs 115 (e.g., a UE 115-*a* and a UE 115-*b*), which may be examples of the corresponding devices as described with reference to FIG. 1. In the example of FIG. 2, the network entities 105 may be examples of a CU 160, a DU 165, an RU 170, a base station 140, an IAB node 104, or one or more other network nodes as described with reference to FIG. 1. The network entity 105-*a* and the network entity 105-*b* may coordinate with each other during path switching and multi-path scenarios.

Some wireless communications systems may support network entity path switching, such as intra-network entity path switching and inter-network entity path switching. For intra-network entity path switching, a network entity 105 may be associated with multiple DUs 165, such as a first DU 165 and a second DU 165, and may switch connections (e.g., paths) between the first DU 165 and the second DU 165. The network entity 105 may communicate, directly or indirectly, with a UE 115, such as a remote UE 115, via the first DU 165. For direct communications, the remote UE 115 may communicate with the first DU 165 directly (e.g., without using a second UE 115, such as a relay UE 115), while for indirect communications, the remote UE 115 may communicate with the first DU 165 via the relay UE 115. In some cases, the remote UE 115 may transmit a measurement report to the first DU 165 indicating a degradation of communications (e.g., signal quality falling below a threshold) between the UE 115 and the first DU 165 and the first DU 165 may switch a first connection between the remote UE 115 and the first DU 165 to a second connection between the remote UE 115 and the second DU 165. In some cases, the second connection between the remote UE 115 and the second DU 165 may be an indirect connection and may involve a relay UE 115 (which may be in a connected mode, an idle mode, or an inactive mode). For example, the first DU 165 may communicate with the remote UE 115 via a first relay UE 115 using a first connection, and may switch the first connection between the remote UE 115, the first relay UE 115, and the first DU 165 to a second connection between the remote UE 115, a second relay UE 115, and the second DU 165 (e.g., intra-network entity 105 indirect to indirect path switching).

In another example, the first DU 165 may communicate with the remote UE 115 directly (e.g., without the first relay UE 115) and may switch a first connection between the remote UE 115 and the first DU 165 to a second connection between the remote UE 115 and the second DU 165 (e.g., intra-network entity 105 direct to indirect path switching). In some other cases, the second connection between the remote UE 115 and the second DU 165 may be direct. For example, the first DU 165 may communicate with the remote UE 115 via a first relay UE 115 and may switch a first connection between the remote UE 115, the first relay UE 115, and the first DU 165 to a second connection between the remote UE 115 and the second DU 165 (e.g., intra-network entity 105 indirect to direct path switching).

For inter-network entity path switching, a first network entity 105 may switch connections (e.g., paths) from the first network entity 105 to a second network entity 105, where each network entity 105 is associated with a CU 160 (e.g., the first network entity 105 is associated with a first CU 160 and the second network entity 105 may be associated with a second CU 160). In some cases, the first network entity 105 may communicate with a remote UE 115 indirectly, via a relay UE 115, and may receive a measurement report from the remote UE 115 (e.g., via the relay UE 115) indicating a degradation of communications between the remote UE 115 and the first network entity 105. In such cases, the first network entity 105 may switch a connection between the remote UE 115, the relay UE 115, and the first network entity 105 to a connection between the remote UE 115 and the second network entity (e.g., inter-network entity 105 indirect to direct path switching). However, current techniques may not provide for additional inter-network entity 105 path switching scenarios.

Similarly, the wireless communications system 200 may support intra-network entity 105 multi-path scenarios and inter-network entity 105 multi-path scenarios. That is, one or more network entities 105 may establish one or more connections (e.g., direct or indirect) with a remote UE 115 and may switch between the one or more connections, communicate via the one or more connections simultaneously, or both. For intra-network entity 105 multi-path scenarios, a network entity 105, communicating with a remote UE 115 using a first DU 165, may be associated with multiple DUs 165, such as the first DU 165 and a second DU 165, and may configure an additional connection (e.g., path) between the remote UE 115 and the second DU 165. In such cases, the network entity 105 may switch communications between the connection between remote UE 115 and the first DU 165 and the connection between remote UE 115 and the second DU 165, or may communicate over the connections simultaneously. In some cases, one or both of the connections between the remote UE 115 and the DUs 165 may utilize one or more relay UEs 115 (e.g., the connections may be indirect), such that the one or more relay UEs 115 relay communications between the remote UE 115 and the one or both of the DUs 165. In some other cases, neither connection between the remote UE 115 and the DUs 165 may utilize a relay UE 115, such that the remote UE 115 communicates with the DUs 165 directly.

For inter-network entity 105 multi-path scenarios, a network entity 105, such as a main network entity 105, may communicate with a remote UE 115 via a first connection (e.g., path) and may configure (e.g., add), release, or change a second connection between the remote UE 115 and a second network entity 105, such as a secondary network entity 105. For example, the remote UE 115 may communicate with the primary network entity 105 via a direct or an indirect connection and may also communicate with the secondary network entity 105 via a direct or an indirect connection. In some cases, the primary network entity 105 (e.g., main network entity) may change the connection between the remote UE 115 and the primary network entity 105 (e.g., direct to indirect or indirect to direct) while refraining from changing the connection between the remote UE 115 and the secondary network entity 105 (e.g., the secondary network entity 105 stays direct or stays indirect). In some other cases, the primary network entity 105 may change the connection between the remote UE 115 and the secondary network entity 105 (e.g., direct to indirect or indirect to direct) while refraining from changing the connection between the remote UE 115 and the primary network entity 105 (e.g., the main network entity 105 stays direct or stays indirect). In some other cases, the primary network entity 105 may change the connection between the remote UE 115 and the primary network entity 105 (e.g., direct to indirect or indirect to direct) while simultaneously changing the connection between the remote UE 115 and the secondary network entity 105 (e.g., direct to indirect or indirect to direct).

In some other cases, the primary network entity 105 may release one or more connections of a remote UE 115. That is, the remote UE 115 may communicate with the primary network entity 105 via a first connection (e.g., direct or indirect) and communicate with the secondary network entity 105 via a second connection (e.g., direct or indirect). Further, the primary network entity 105 may release the second connection with the second network entity 105. For example, the primary network entity 105 may communicate with the remote UE 115 via a direct connection or an indirect connection and may release a direct connection between the remote UE 115 and the secondary network entity 105 (e.g., direct path release over secondary network entity 105). In another example, the primary network entity 105 may communicate with the remote UE 115 via a direct connection or an indirect connection and may release an indirect connection between the remote UE 115 and the secondary network entity 105 (e.g., indirect path release over secondary network entity 105).

In some other cases, the primary network entity 105 may add a connection between the remote UE 115 and a secondary network entity 105. For example, the remote UE 115 may communicate with the primary network entity 105 via a first direct connection or a first indirect connection (e.g., using a relay UE 115) and may configure (e.g., add) the remote UE 115 to communicate with the secondary network entity 105 via a second connection, where the second connection may be direct (e.g., direct path addition over secondary network entity 105) or indirect (e.g., indirect path addition over secondary network entity 105). However, some wireless communications techniques for connection addition (e.g., for configuring a remote UE 115 with a second connection between the remote UE 115 and the secondary network entity 105) may be improved.

Techniques described herein may support network coordination during path switching and multi-path scenarios, specifically inter-network entity path switching and inter-network entity path addition. For example, a UE 115-*a* (e.g., a remote UE 115) may communicate with a network entity 105-*a*, which may be an example of a primary network entity 105 (e.g., main network entity) or a source network entity 105, via a communication link 205 (e.g., connection or path). In some cases, the UE 115-*a* may transmit a measurement report 220 to the network entity 105-*a* indicating a degradation of communications over the communication link 205. Additionally, the measurement report 220 may include an indication of one or more UEs 115, such as a UE 115-*b*, that may be utilized for relaying communications between the UE 115-*a* and a second network entity 105, such as the network entity 105-*b*, which may be an example of a target network entity 105 or a secondary network entity 105. For example, the measurement report 220 may include a set of identifiers (e.g., target UE 115 L2 identifiers) associated with each UE 115 of the one or more UEs 115.

The network entity 105-*a* may receive the measurement report 220 and may transmit a message, such as a connection request 225, to the network entity 105-*b* for switching (e.g., or adding) a connection between the UE 115-*a* and the network entity 105-*a* to a connection between the UE 115-*a* and the network entity 105-*b*. The connection request 225 may include a first identifier associated with the UE 115-*a* (e.g., a remote UE 115 L2 identifier) and the set of identifiers associated with one or more UEs 115, such as a second identifier associated with the UE 115-*b* (e.g., a target UE 115 L2 identifier).

The network entity 105-*b* may receive the connection request 225 and assign (e.g., generate) a third identifier associated with the UE 115-*a* (e.g., a remote UE 115 local identifier). Additionally, or alternatively, the network entity 105-*b* may select the UE 115-*b* from the one or more UEs 115 indicated in the connection request 225. Alternatively, the connection request 225 may indicate the UE 115-*b* and associated identifier, such that the network entity 105-*b* may refrain from performing a selection (e.g., the connection request 225 indicates one target UE 115, such as the UE 115-*b*). The network entity 105-*b* may transmit a connection acknowledgment 230 to the network entity 105-*a* based on receiving the connection request 225. Additionally, the connection acknowledgment 230 may indicate the first identifier associated with the UE 115-*a*, the second identifier associated with the UE 115-*b*, and the third identifier associated with the UE 115-*a*.

The network entity 105-*a* may receive the connection acknowledgment 230 and transmit a configuration message 235-*a* to the UE 115-*a* indicating the third identifier associated with the UE 115-*a* and the second identifier associated with the UE 115-*b*. In some cases, the network entity 105-*b* may transmit a configuration message 235-*b* to the UE 115-*b* via a communication link 215 indicating the first identifier associated with the UE 115-*a* and the third identifier associated with the UE 115-*a*.

Further, the network entity 105-*b* may communicate with the UE 115-*a* via the UE 115-*b* (e.g., direct to indirect path switch or direct to direct and indirect path addition) based on the configuration messages 235. That is, the UE 115-*a* may transmit uplink communications to the UE 115-*b* via a communication link 210 and the UE 115-*b* may relay the uplink communications to the network entity 105-*b* via the communication link 215. Conversely, the network entity 105-*b* may transmit downlink communications to the UE 115-*b* via the communication link 215 and the UE 115-*b* may relay the downlink communications to the UE 115-*a* via the communication link 210.

In some cases, the UE 115-*a* may simultaneously communicate with the network entity 105-*a* via the communication link 205 and with the network entity 105-*b* via the UE 115-*b* over the communication link 210 and communication link 215. Alternatively, the UE 115-*a* may refrain from communicating with the network entity 105-*a* via the communication link 205 while communicating with the network entity 105-*b* via the UE 115-*b* over the communication link 210 and communication link 215.

Additionally, or alternatively, the UE 115-*a* may communicate with the network entity 105-*a* via a relay UE 115 (e.g., an indirect connection). In such cases, the network entity 105-*a* may switch a connection between the UE 115-*a*, the relay UE 115 (e.g., which is not the same as the UE 115-*b*), and the network entity 105-*a* to a connection between the UE 115-*a*, the UE 115-*b*, and the network entity 105-*b* (e.g., indirect to indirect path switch or indirect to indirect and indirect path addition).

Figure 3A:
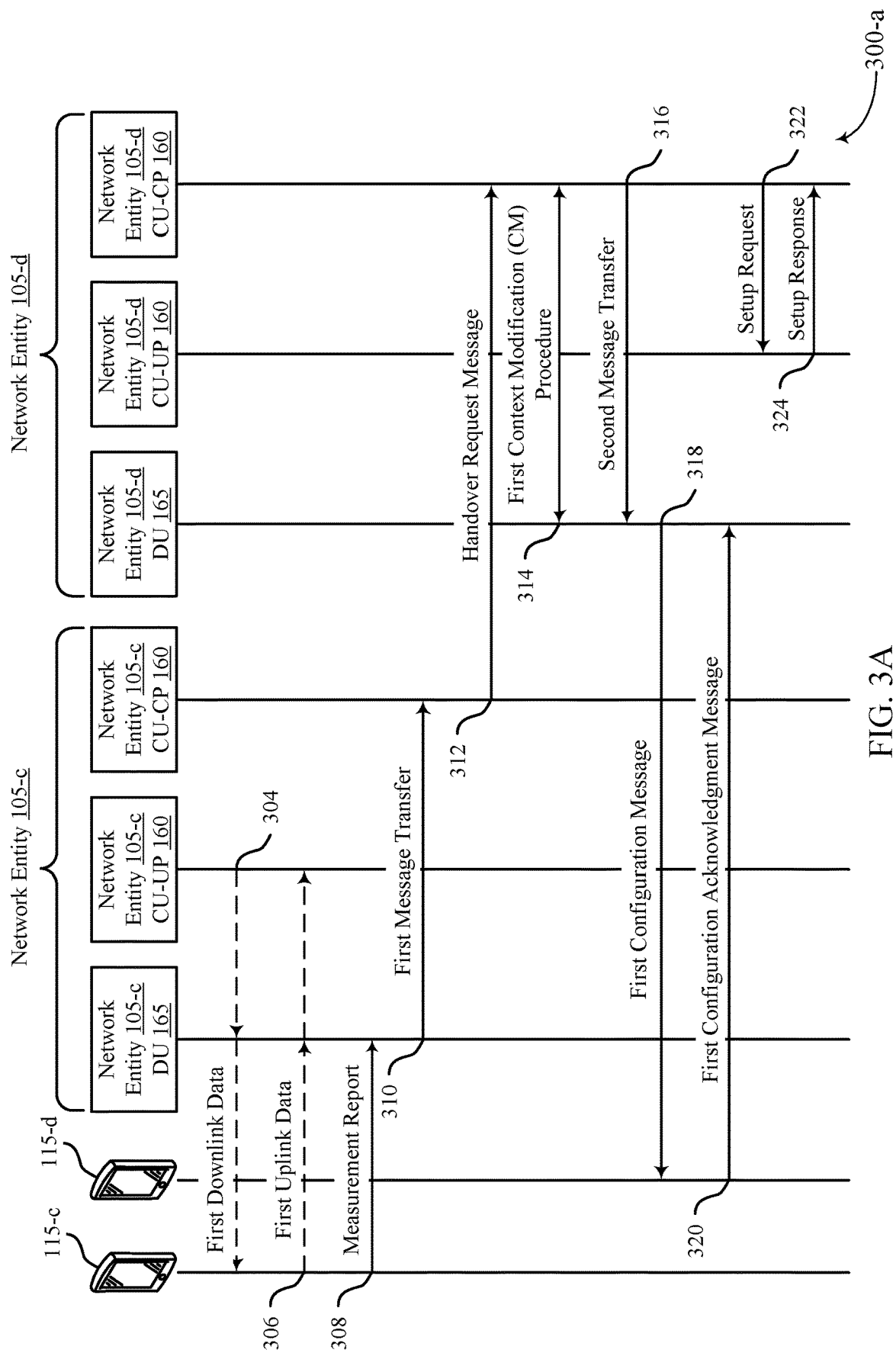
FIGS. 3A, 3B, and 3C illustrate a continuous example of a path switching procedure that supports network coordination during path switching and multi-path scenarios in accordance with one or more aspects of the present disclosure.
Figure 3B:
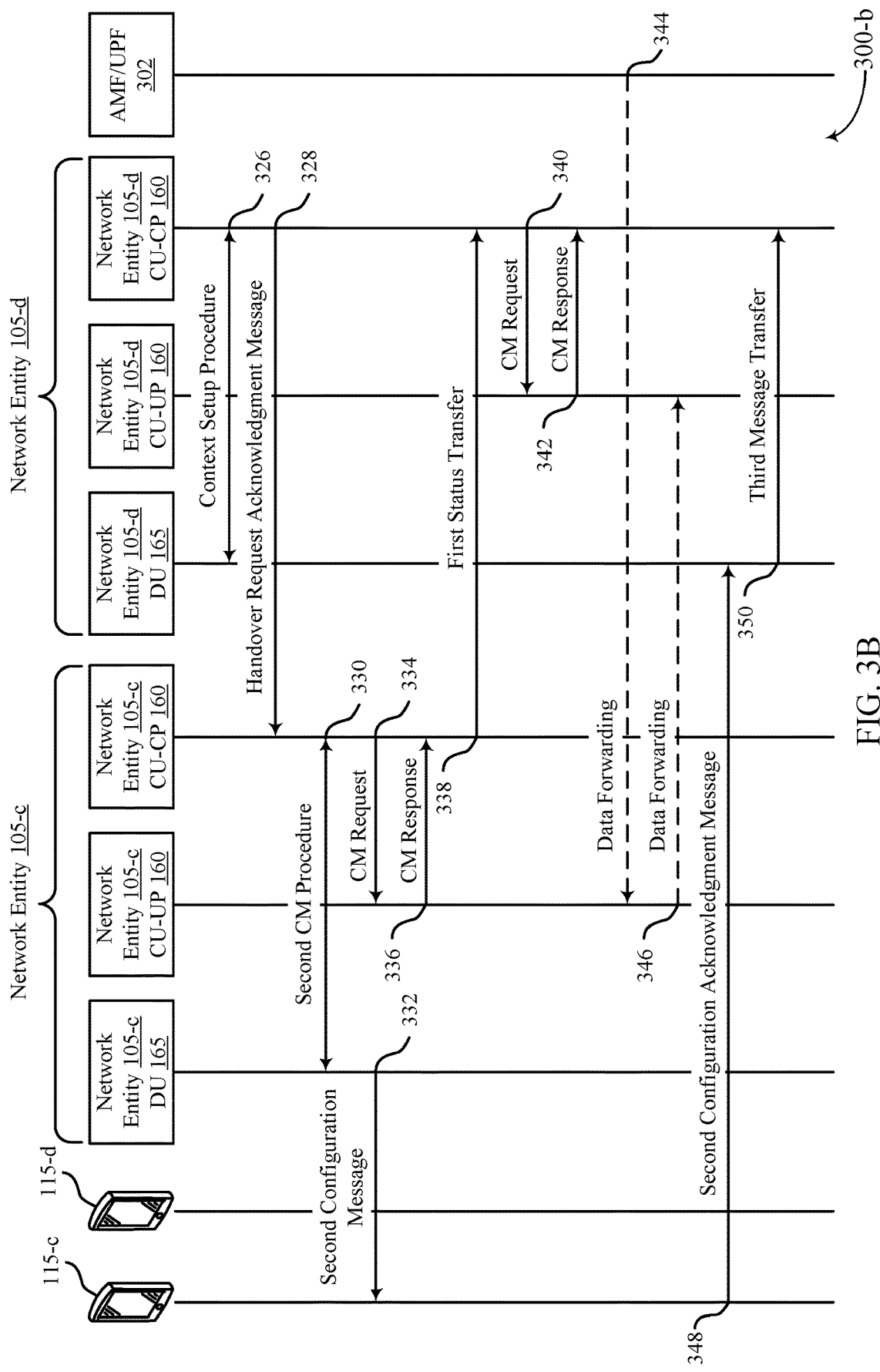
Figure 3C:
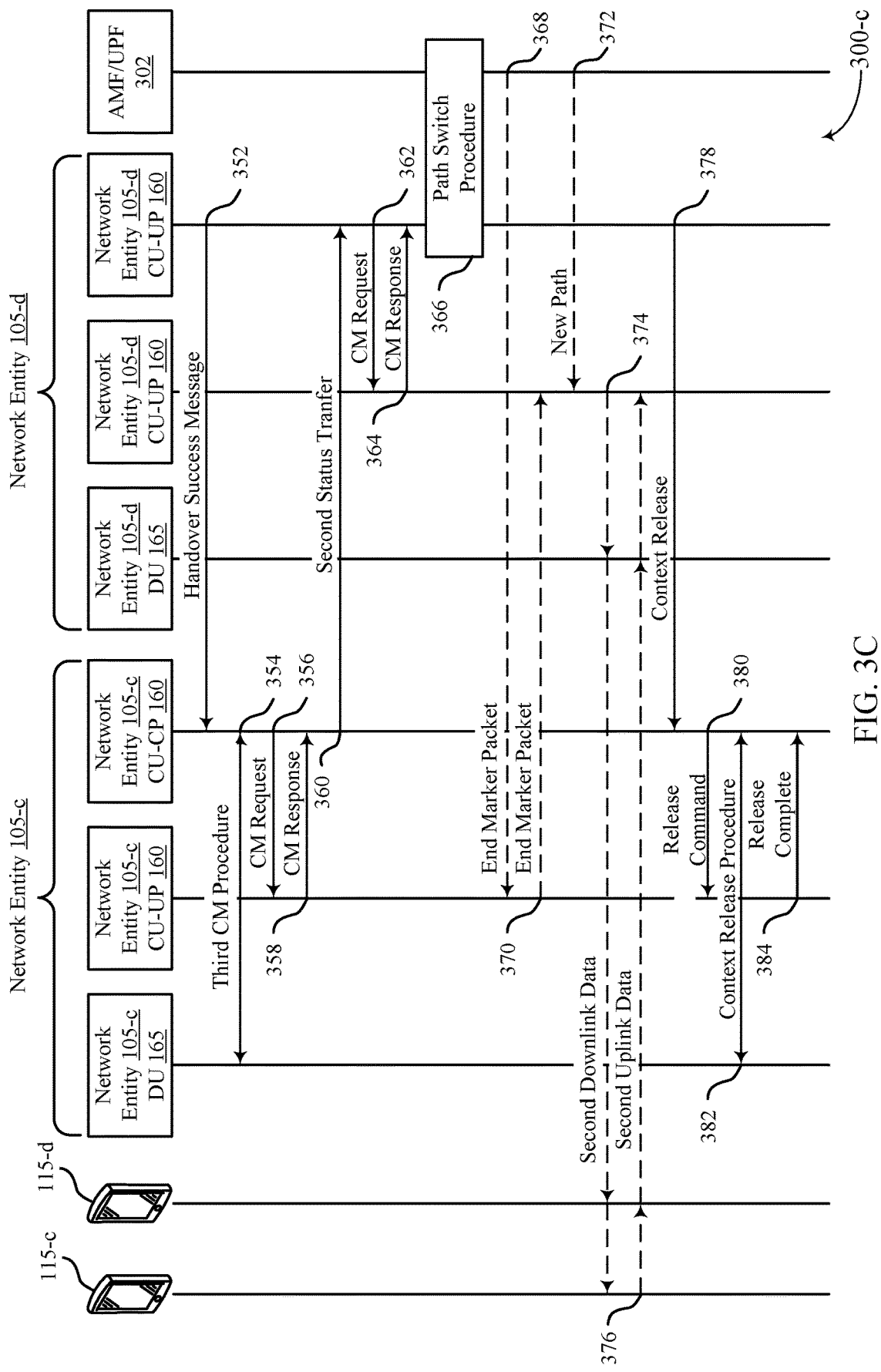

FIGS. 3A, 3B, and 3C each illustrate a portion of a path switching procedure 300 that supports network coordination during path switching and multi-path scenarios in accordance with one or more aspects of the present disclosure. In some examples, the path switching procedure 300 (e.g., a path switching procedure 300-*a*, a path switching procedure 300-*b*, and a path switching procedure 300-*c*) may implement aspects of the wireless communications system 100 and the path switching procedure 300. For example, the path switching procedure 300 may include one or more network entities 105 (e.g., a network entity 105-*c* and a network entity 105-*d*) and one or more UEs 115 (e.g., a UE 115-*c* and a UE 115-*d*), which may be examples of the corresponding devices as described with reference to FIG. 1. The path switching procedure 300 may also include a user plane function (UPF)/access and mobility management (AMF) 302. In the example of FIG. 3A, FIG. 3B, and FIG. 3C, the network entities 105 may be examples of a CU 160, a DU 165, an RU 170, a base station 140, an IAB node 104, or one or more other network nodes as described with reference to FIG. 1. The network entity 105-*c* and the network entity 105-*d* may coordinate with each other during the path switching procedure 300.

Starting with FIG. 3A illustrating the path switching procedure 300-*a*, at 304, a network entity 105-*c* CU-UP 160 may transmit first downlink data (e.g., user data) to the UE 115-*c* via a network entity 105-*c* DU 165 and, at 306, the UE 115-*c* may transmit uplink data to the network entity 105-*c* CU-UP 160 via the network entity 105-*c* DU.

At 308, the UE 115-*c* may transmit a measurement report to the network entity 105-*c* DU 165. The measurement report may indicate a degradation of communications between the UE 115-*c* and the network entity 105-*c*. In some cases, the measurement report may include an indication of a set of identifiers (e.g., target relay UE 115 L2 identifier(s)) associated with multiple UEs, including a second identifier associated with the UE 115-*d*, where the multiple UEs are associated with respective candidate relay connections between the UE 115-*c* and the network entity 105-*c*. In some cases, the measurement report may include a single identifier associated with a candidate relay connection (e.g., an indication of one target relay UE 115). The measurement report may also include an indication of a first identifier associated with the UE 115-*c* (e.g., remote UE 115 L2 identifier). In some cases, the network entity 105-*c* may communicate with the UE 115-*c* via a relay UE 115.

At 310, the network entity 105-*c* DU 165 may perform a first message transfer in which the network entity 105-*c* DU 165 transfers the measurement report to the network entity 105-*c* CU-CP 160.

At 312, the network entity 105-*c* CU-CP 160 may transmit, to the network entity 105-*d* CU-CP 160, a handover request message. In some cases, the handover request message may include a request for switching a connection between the UE 115-*c* and the network entity 105-*c* to a connection between the UE 115-*c* and the network entity 105-*d* based on receiving the measurement report. Additionally, the handover request message may include the set of identifiers associated with the multiple UEs, including the second identifier associated with the UE 115-*d*, and the first identifier associated with the UE 115-*c*.

In some cases, at 314, the network entity 105-*d* DU 165 and the network entity 105-*d* CU-CP 160 may perform a first context modification (CM) procedure. For example, the network entity 105-*d* may detect an operational state (e.g., an active, an inactive, or an idle mode) of the UE 115-*d* and may perform the first CM procedure based on the UE 115-*d* being in an active mode (e.g., RRC Connected state). In another example, the network entity 105-*d* may refrain from performing the first CM procedure based on the UE 115-*d* being in an inactive or idle mode (RRC IDLE/INACTIVE state).

In some cases, at 316, the network entity 105-*d* CU-CP 160 may perform a second message transfer (e.g., downlink RRC message transfer) to the network entity 105-*d* DU 165.

At 318, the network entity 105-*d* may select the UE 115-*d* from the multiple UEs indicated in the handover request message and the network entity 105-*d* DU 165 may transmit, to the UE 115-*d*, a first configuration message (e.g., RRCReconfiguration) indicating the first identifier associated with the UE 115-*c* and a third identifier (e.g., a remote UE 115 local identifier) associated with the UE 115-*c* (e.g., when the UE 115-*c* is in an active or connected mode), where the third identifier is assigned by the network entity 105-*d*. In some cases, the first configuration message may include an indication of a set of sidelink control group (SCG) resources for communications between the UE 115-*c*, the UE 115-*d*, and the network entity 105-*d* (e.g., as determined by the network entity 105-*d*). Additionally, or alternatively, the first configuration message may include an indication of a sidelink protocol (e.g., sidelink relay adaption protocol (SRAP), UE 115-*c* bearer to PC5 radio link control (RLC) channel mapping). In some cases, the network entity 105-*d* may transmit the first configuration message indicating the first identifier associated with the UE 115-*c* and the third identifier associated with the UE 115-*c* based on a request (e.g., using a supplemental user identification (SUI) procedure), from the UE 115-*d*, requesting the third identifier (e.g., when the UE 115-*d* is in an inactive or idle mode).

At 320, the UE 115-*d* may transmit, to the network entity 105-*d*, a first configuration acknowledgment message (e.g., RRCReconfigurationComplete) indicating that the UE 115-*d* is configured for relaying communications between the UE 115-*c* and the network entity 105-*d*.

At 322, the network entity 105-*d* CU-CP 160 may transmit a setup request (e.g., a bearer context setup request) to the network entity 105-*d* CU-UP 160 and, at 324, the network entity 105-*d* CU-UP 160 may transmit a setup response (e.g., a bearer context setup response) to the network entity 105-d CU-CP 160.

Continuing with FIG. 3B illustrating the path switching procedure 300-b, at 326, the network entity 105-d CU-CP 160 and the network entity 105-d DU 165 may perform a UE 115-c context setup procedure.

At 328, the network entity 105-d CU-CP 160 may transmit, to the network entity 105-c CU-CP 160, an handover request acknowledgment message (e.g., acknowledging the handover request message) indicating the first identifier associated with the UE 115-c and the third identifier associated with the UE 115-d. In some cases, the handover request acknowledgment message may include an indication of the set of SCG resources for communications between the UE 115-c, the UE 115-d, and the network entity 105-d.

At 330, the network entity 105-c CU-CP 160 and the network entity 105-c DU 165 may perform a UE 115-c context modification procedure.

At 332, the network entity 105-c DU 165 may transmit, to the UE 115-c, a second configuration message indicating the third identifier associated with the UE 115-c and the second identifier associated with the UE 115-d. In some cases, the second configuration message may include an indication of the set of SCG resources for communications between the UE 115-c, the UE 115-d, and the network entity 105-d. Additionally, or alternatively, the second configuration message may include an indication of a sidelink protocol (e.g., SRAP, UE 115-e bearer to PC5 RLC channel mapping).

At 334, the network entity 105-c CU-CP 160 may transmit a CM request (e.g., a bearer CM request) to the network entity 105-c CU-UP 160 and, at 336, the network entity 105-c CU-UP 160 may transmit a CM response (e.g., a bearer CM response) to the network entity 105-c CU-CP 160.

At 338, the network entity 105-c CU-CP 160 may perform a first status transfer (e.g., secondary node status transfer or early status transfer) to the network entity 105-d CU-CP 160.

At 340, the network entity 105-d CU-CP 160 may transmit a CM request (e.g., a bearer CM request) to the network entity 105-d CU-UP 160 and, at 342, the network entity 105-d CU-UP 160 may transmit a CM response (e.g., a bearer CM response) to the network entity 105-d CU-CP 160.

In some cases, at 344, the AMF/UPF 402 may transmit data to the network entity 105-c CU-CP 160 for forwarding to the network entity 105-d CU-CUP 160 and, at 346, the network entity 105-c CU-CP 160 may forward the data to the network entity 105-d CU-CP 160.

At 348, the UE 115-c may transmit, to the network entity 105-d DU 165, a second configuration acknowledgment message (e.g., RRCReconfigurationComplete) indicating that the UE 115-c is configured to relaying communications to the network entity 105-d via the UE 115-d. In some cases, the second configuration acknowledgment message may include an indication that the UE 115-c and the UE 115-d have successfully established sidelink communications. In some cases, the network entity 105-d DU 165 may forward an indication of the second configuration acknowledgment message (e.g., via a third message transfer at 350) to the network entity 105-d CU-CP 160. Additionally, the UE 115-c may connect with the network entity 105-d via a random access procedure (e.g., a random access channel (RACH) procedure).

Continuing with FIG. 3C illustrating the path switching procedure 300-c, at 352, the network entity 105-d CU-CP 160 may transmit, the network entity 105-c CU-CP 160, a handover success message indicating that the handover procedure was successful.

At 354, the network entity 105-c CU-CP 160 and the network entity 105-c DU 165 may perform a UE 115-c context modification procedure.

At 356, the network entity 105-c CU-CP 160 may transmit a CM request (e.g., a bearer CM request) to the network entity 105-c CU-UP 160 and, at 358, the network entity 105-c CU-UP 160 may transmit a CM response (e.g., a bearer CM response) to the network entity 105-c CU-CP 160.

At 360, the network entity 105-c CU-CP 160 may perform a second status transfer (e.g., secondary node status transfer) to the network entity 105-d CU-CP 160.

At 362, the network entity 105-d CU-CP 160 may transmit a CM request (e.g., a bearer CM request) to the network entity 105-d CU-UP 160 and, at 364, the network entity 105-d CU-UP 160 may transmit a CM response (e.g., a bearer CM response) to the network entity 105-d CU-CP 160.

At 366, the network entity 105-d CU-UP 160 may perform a path switch procedure with the AMF/UPF 302.

At 368, the AMF/UPF 302 may transmit an end marker packet to the network entity 105-c CU-UP 160 and, at 370, the network entity 105-c CU-UP 160 may forward the end marker packet to the network entity 105-d CU-UP 160. Additionally, at 372, the AMF/UPF 302 may transmit an indication of a new path (e.g., the new connection established via the handover procedure) to the network entity 105-d CU-UP 160.

At 374, the network entity 105-d CU-UP 160 may transmit second downlink data (e.g., user date) to the UE 115-c via the network entity 105-d DU 165 and the UE 115-d. Additionally, at 376, the UE 115-c may transmit second uplink data to the network entity 105-d CU-UP 160 via the UE 115-d and the network entity 105-d DU 165.

At 378, the network entity 105-d CU-UP 160 may transmit a context release (e.g., UE 115-c context release) to the network entity 105-c CU-CP 160 indicting that the network entity 105-c may release the connection with the UE 115-c.

At 380, the network entity 105-c CU-CP 160 may transmit a release command (e.g., bearer context release command) to the network entity 105-c CU-UP 160 and, at 382, may perform a context release procedure (e.g., UE 115-c context release procedure) with the network entity 105-c DU 165. At 384, upon completion of the procedure, the network entity 105-c CU-UP 160 may transmit an indication of the completed procedure (e.g., bearer context release complete) to the network entity 105-d CU-CP 160.

Though communications between the UE 115-c and the network entity 105-c are initially described in the context of a direct communication link (e.g., the UE 115-c communicates directly with the network entity 105-c), it is to be understood that the UE 115-c may communicate with the network entity 105-c via an relay UE 115 (e.g., the relay UE 115 relays uplink communications from the UE 115-c to the network entity 105-c and relay downlink communications from the network entity 105-c to the UE 115-c). That is, the path switching procedure 300 may support network coordination for a path switching scenario associated with switching from an indirect communication path (e.g., the UE 115-c communicates with the network entity 105-c via the initial relay UE 115) to an indirect communication path (e.g., the UE 115-c communicates with the network entity 105-d via the initial UE 115-d).

Figure 4:
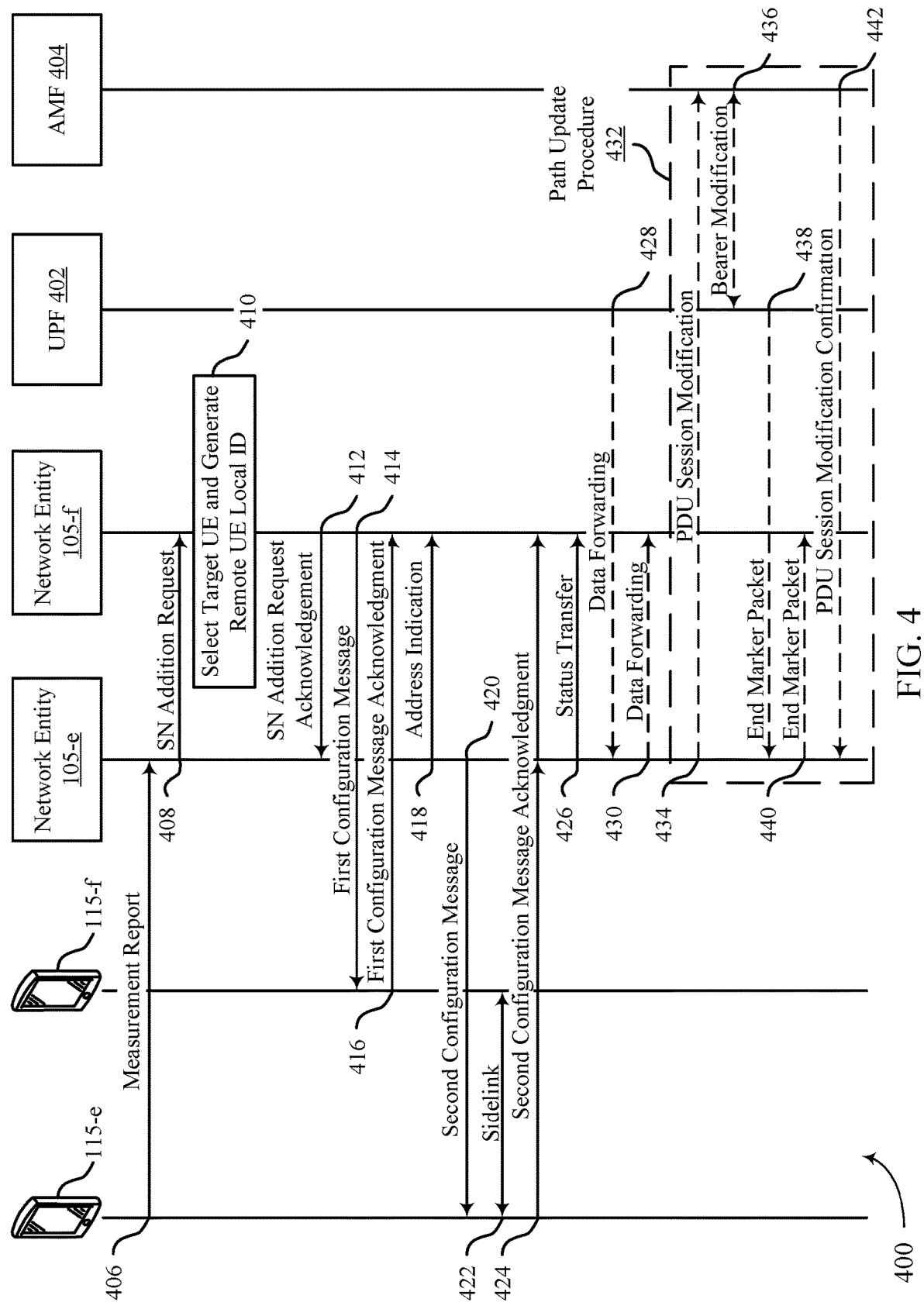
FIG. 4 illustrates an example of a path addition procedure that supports network coordination during path switching and multi-path scenarios in accordance with one or more aspects of the present disclosure.

FIG. 4 illustrates an example of a path addition procedure 400 that supports network coordination during path switching and multi-path scenarios in accordance with one or more aspects of the present disclosure. In some examples, the path addition procedure 400 may implement aspects of the wireless communications system 100, the wireless communications system 200, and the path switching procedure 300. For example, the path addition procedure 400 may include one or more network entities 105 (e.g., a network entity 105-*e* and a network entity 105-*f*) and one or more UEs 115 (e.g., a UE 115-*e* and a UE 115-*f*), which may be examples of the corresponding devices as described with reference to FIG. 1. Additionally, the path addition procedure 400 may include a UPF 402 and an AMF 404. In the example of FIG. 4, the network entities 105 may be examples of a CU 160, a DU 165, an RU 170, a base station 140, an IAB node 104, or one or more other network nodes as described with reference to FIG. 1. The network entity 105-*e* and the network entity 105-*f* may coordinate with each other during the path addition procedure 400.

At 406, the network entity 105-*e* may transmit a measurement report to the network entity 105-*e*. The measurement report may indicate a degradation of communications between the UE 115-*e* and the network entity 105-*e*. In some cases, the measurement report may include an indication of a set of identifiers (e.g., target relay UE 115 L2 identifier(s)) associated with multiple UEs, including a second identifier associated with the UE 115-*f*, where the multiple UEs are associated with respective candidate relay connections between the UE 115-*e* and the network entity 105-*f*. In some cases, the measurement report may include n single identifier associated with a candidate relay connection (e.g., an indication of one target relay UE 115). The measurement report may also include an indication of a first identifier associated with the UE 115-*e* (e.g., remote UE 115 L2 identifier). In some cases, the network entity 105-*e* may communicate with the UE 115-*e* via a relay UE 115.

At 408, the UE 115-*e* may transmit a secondary node (SN) (e.g., secondary network entity 105) addition request. In some cases, the SN addition request may include a request for switching a connection between the UE 115-*e* and the network entity 105-*e* to a connection between the UE 115-*e* and the network entity 105-*f* based on receiving the measurement report. In some other cases, the SN addition request may include a request to configure (e.g., add) a connection between the UE 115-*e* and the network entity 105-*f* based on receiving the measurement report. Additionally, the SN addition request may include the set of identifiers associated with the multiple UEs, including the second identifier associated with the UE 115-*f*, and the first identifier associated with the UE 115-*e*.

At 410, the network entity 105-*f* may select a target UE 115, such as the UE 115-*f*, from the multiple UEs associated with the set of identifiers and may generate (e.g., assign) a third identifier (e.g., a remote UE 115 local identifier) to the UE 115-*e*. In some cases, the SN addition request may include an indication of a single target UE 115 and the network entity 105-*f* may select the single target UE 115. In some cases, the network entity 105-*f* may determine a set of SCG resources for communications between the UE 115-*e*, the UE 115-*f*, and the network entity 105-*f*.

At 412, the network entity 105-*f* may transmit an SN addition request acknowledgment (e.g., acknowledging the request message) indicating the first identifier associated with the UE 115-*e* and the third identifier associated with the UE 115-*e*. In some cases, the SN addition request acknowledgment may include an indication of the set of SCG resources for communications between the UE 115-*e*, the UE 115-*f*, and the network entity 105-*f*. Additionally, or alternatively, the SN addition request acknowledgment may include an indication of a sidelink protocol (e.g., SRAP, UE 115-*e* bearer to PC5 RLC channel mapping).

At 414, the network entity 105-*f* may transmit, to the UE 115-*f*, a first configuration message (e.g., RRCReconfiguration) indicating the first identifier associated with the UE 115-*e* and the third identifier associated with the UE 115-*e* (e.g., when the UE 115-*f* is in an active or connected mode). In some cases, the first configuration message may include an indication of the set of SCG resources for communications between the UE 115-*e*, the UE 115-*f*, and the network entity 105-*f*. Additionally, or alternatively, the first configuration message may include an indication of a sidelink protocol (e.g., SRAP, UE 115-*e* bearer to PC5 RLC channel mapping). In some cases, the network entity 105-*f* may transmit the first configuration message indicating the first identifier associated with the UE 115-*e* and the third identifier associated with the UE 115-*e* based on a request, from the UE 115-*f*, requesting the third identifier (e.g., when the UE 115-*f* is in an inactive or idle mode). For example, the network entity 105-*f* may detect that the UE 115-*f* is in an inactive mode (e.g., an operational state of the UE 115-*f*) and may monitor for the request from the UE 115-*f*. As such, the UE 115-*f* may transmit the request (e.g., via SUI) and the network entity 105-*f* may transmit the first configuration message based on receiving the request.

At 416, the UE 115-*f* may transmit, to the network entity 105-*f*, a first configuration acknowledgment message (e.g., RRCReconfigurationComplete) indicating that the UE 115-*f* is configured for relaying communications between the UE 115-*e* and the network entity 105-*f*. At 418, the network entity 105-*e* may transmit, to the network entity 105-*f*, an address indication (e.g., Xn-U address).

At 420, the network entity 105-*e* may transmit, to the UE 115-*e*, a second configuration message indicating the third identifier associated with the UE 115-*e* and the second identifier associated with the UE 115-*f*. In some cases, the second configuration message may include an indication of the set of SCG resources for communications between the UE 115-*e*, the UE 115-*f*, and the network entity 105-*f*. Additionally, or alternatively, the second configuration message may include an indication of a sidelink protocol (e.g., SRAP, UE 115-*e* bearer to PC5 RLC channel mapping).

At 422, the UE 115-*e* and the UE 115-*f* may establish a sidelink communication link (e.g., a PC5 connection). At 424, the UE 115-*e* may transmit, to the network entity 105-*e*, a second configuration acknowledgment message (e.g., RRCReconfigurationComplete) indicating that the UE 115-*e* is configured to relaying communications to the network entity 105-*f* via the UE 115-*f*. In some cases, the second configuration acknowledgment message may include an indication that the UE 115-*e* and the UE 115-*f* have successfully established sidelink communications. In some cases, the network entity 105-*e* may forward an indication of the second configuration acknowledgment message to the network entity 105-*f*.

At 426, the network entity 105-*e* may transmit a status transfer (e.g., SN status transfer) to the network entity 105-*f*. In some cases, at 428, the UPF 402 may transmit data to the network entity 105-*e* for forwarding to the network entity 105-*f* and, at 430, the network entity 105-*e* may forward the data to the network entity 105-*f*.

In some cases, at 432, the network entities 105, the UPF 402, and the AMF 404 may perform a path update procedure, for example, when the network entity 105 updates the first identifier associated with the UE 115-e (e.g., the network entity 105-e may update the first identifier).

In such cases, at 434, the network entity 105-e may transmit a protocol data unit (PDU) session modification message to the AMF 404 and, at 436, the AMF 404 may transmit a bearer modification to the UPF 402.

At 438, the UPF 402 may transmit an end marker packet to the network entity 105-e and, at 440, the network entity 105-e may forward the end marker packet to the network entity 105-f. In some cases, the end marker packet may include a fourth identifier associated with the UE 115-e, where the fourth identifier is based on updating the first identifier (e.g., an updated remote UE 115 L2 identifier).

At 442, the AMF 404 may transmit a PDU session modification confirmation to the network entity 105-e indicating that the PDU session modification was successful.

Though described in the context of an indirect communication path addition, it is to be understood that the techniques described herein may also be applied for an indirect communication path modification. For example, the remote UE 115-e may communicate with the network entity 105-f via a first direct connection and the network entity 105-e may configure the UE 115-e to switch paths from the first direct connection to a second indirect connection between the UE 115-e and the network entity 105-f. In another example, the remote UE 115-e may communicate with the network entity 105-f via a first indirect connection associated with a first relay UE 115 and the network entity 105-e may configure the UE 115-e to switch paths from the first indirect connection to a second indirect connection between the UE 115-e and the network entity 105-f associated with a second relay UE 115. That is, the network entity 105-e may configure the UE 115-e to switch communications with the network entity 105-f from a first relay UE 115 to a second relay UE 115. Additionally, or alternatively, though described in the context of an indirect communication path addition, it is understood that the techniques described herein may be applied for any inter-network entity 105 multi-path scenarios.

Figure 5:
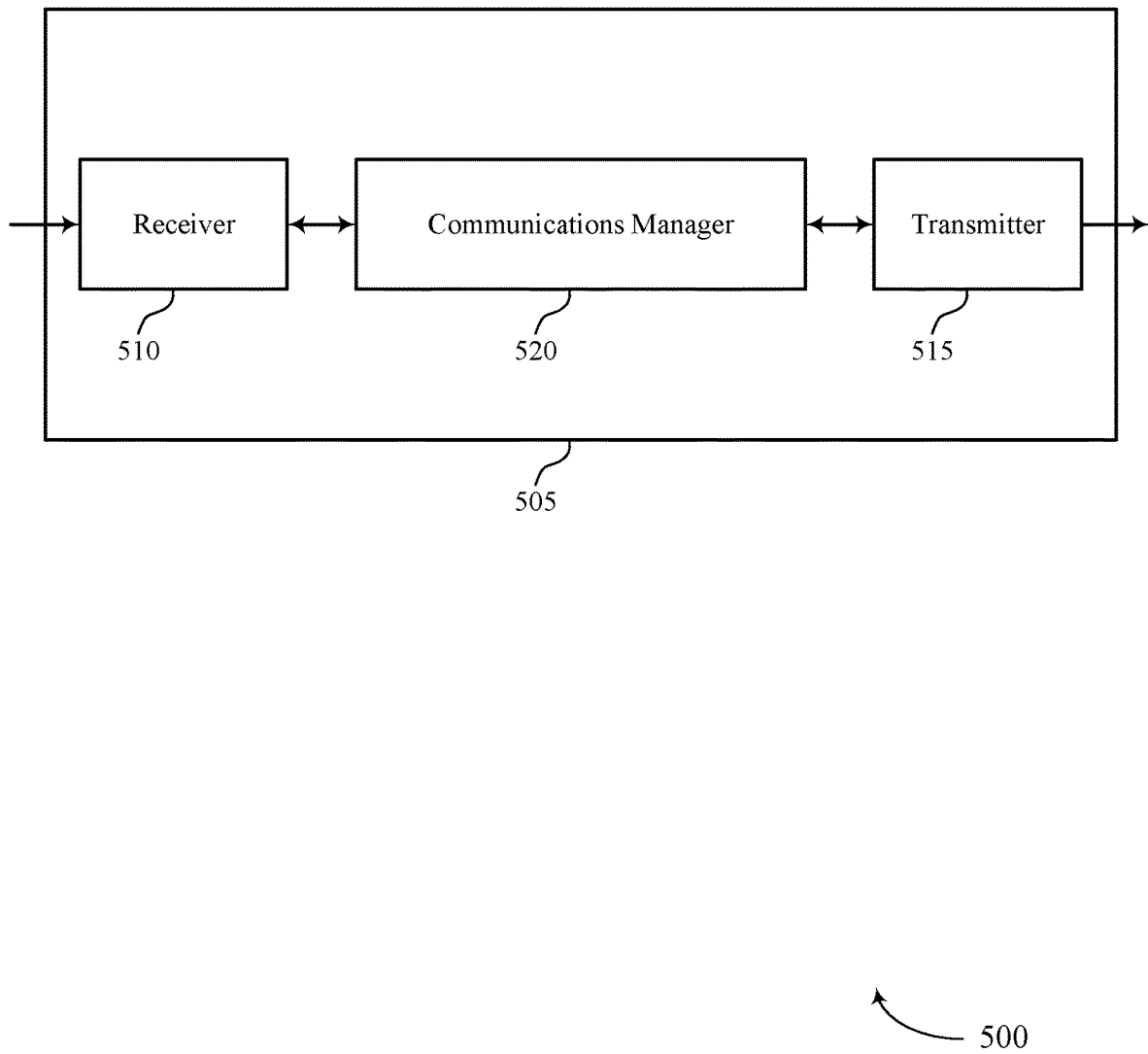
FIGS. 5 and 6 show block diagrams of devices that support network coordination during path switching and multi-path scenarios in accordance with one or more aspects of the present disclosure.

FIG. 5 shows a block diagram 500 of a device 505 that supports network coordination during path switching and multi-path scenarios in accordance with one or more aspects of the present disclosure. The device 505 may be an example of aspects of a network entity 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The communications manager 520, the receiver 510, the transmitter 515, or various combinations thereof or various components thereof may be examples of means for performing various aspects of network coordination during path switching and multi-path scenarios as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a first network entity in accordance with examples as disclosed herein. For example, the communications manager 520 may be configured as or otherwise support a means for receiving, from a first UE, a first message including a measurement report indicating a degradation of communications between the first UE and the first network entity. The communications manager 520 may be configured as or otherwise support a means for transmitting, to a second network entity, a second message for switching a connection between the first UE and the first network entity to a connection between the first UE and the second network entity based on receiving the measurement report indicating the degradation of communications, the second message indicating a set of identifiers including at least a first identifier associated with the first UE and a second identifier associated with a second UE, where the first network entity is associated with a first CU and the second network entity is associated with a second CU different from the first CU. The communications manager 520 may be configured as or otherwise support a means for transmitting, to the first UE, a third message indicating a third identifier associated with the first UE and the second identifier associated with the second UE, where the third identifier associated with the first UE is based on an assignment of the first UE at the second network entity, the assignment of the third identifier to the first UE being in accordance with a relay connection establishment between the first UE, the second UE, and the second network entity as part of switching the connection between the first UE and the first network entity to the connection between the first UE and the second network entity.

Additionally, or alternatively, the communications manager 520 may support wireless communications at a second network entity in accordance with examples as disclosed herein. For example, the communications manager 520 may be configured as or otherwise support a means for receiving, from a first network entity, a first message for switching a connection between a first UE and the first network entity to a connection between the first UE and the second network entity, the first message indicating a set of identifiers including at least a first identifier associated with the first UE and a second identifier associated with a second UE, where the first network entity is associated with a first CU and the second network entity is associated with a second CU different from the first CU. The communications manager 520 may be configured as or otherwise support a means for transmitting, to the first network entity, a second message indicating the first identifier associated with the first UE, the second identifier associated with the second UE, and a third identifier associated with the first UE, where the third identifier associated with the first UE is based on an assignment of the first UE at the second network entity, the assignment of the third identifier to the first UE being in accordance with a relay connection establishment between the first UE, the second UE, and the second network entity as part of switching the connection between the first UE and the first network entity to the connection between the first UE and the second network entity. The communications manager 520 may be configured as or otherwise support a means for communicating with the first UE via the second UE based on transmitting the second message.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for network coordination during path switching and multi-path scenarios which may result in reduced processing, reduced power consumption, and more efficient utilization of communication resources, among other advantages.

Figure 6:
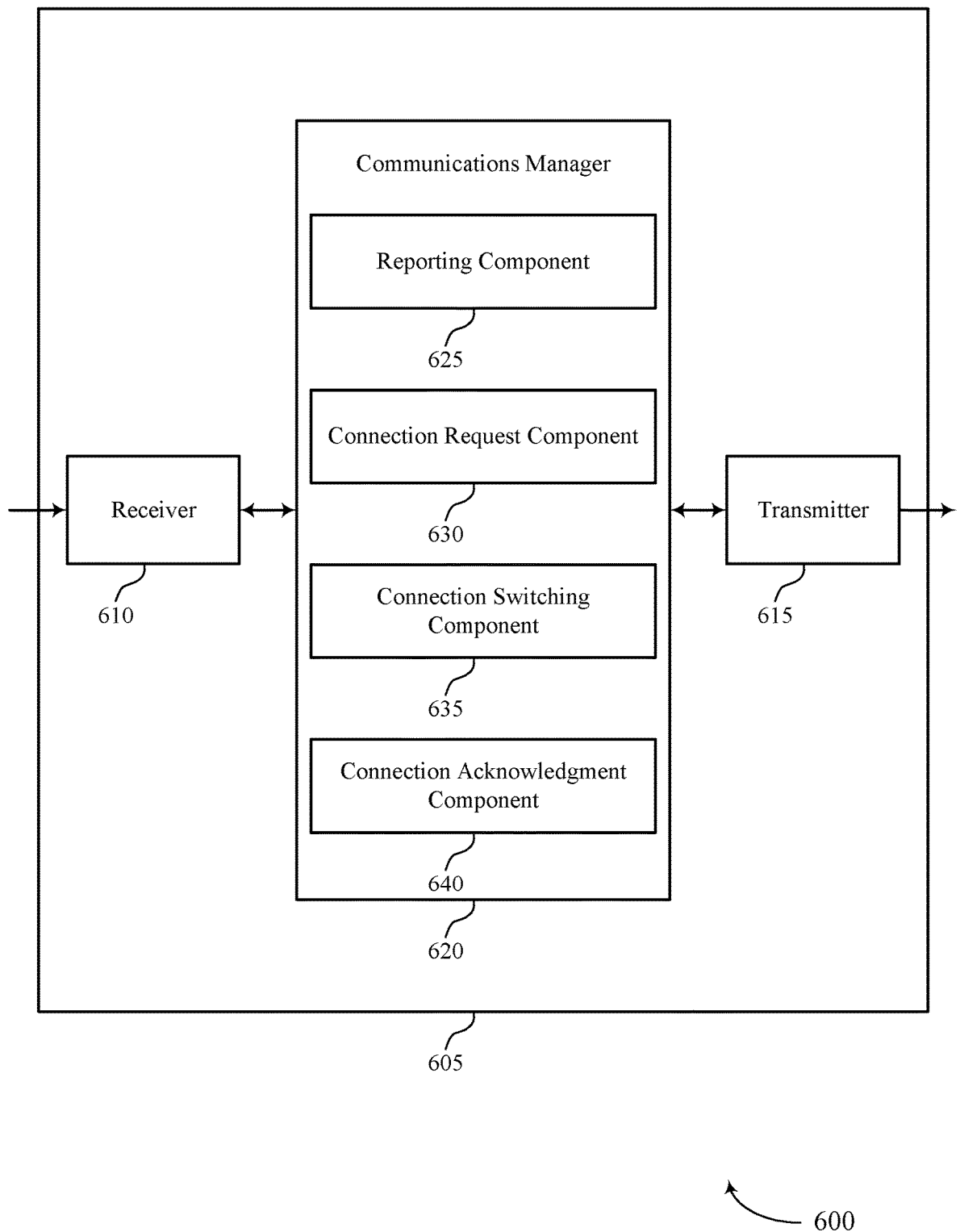

FIG. 6 shows a block diagram 600 of a device 605 that supports network coordination during path switching and multi-path scenarios in accordance with one or more aspects of the present disclosure. The device 605 may be an example of aspects of a device 505 or a network entity 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The device 605, or various components thereof, may be an example of means for performing various aspects of network coordination during path switching and multi-path scenarios as described herein. For example, the communications manager 620 may include a reporting component 625, a connection request component 630, a connection switching component 635, a connection acknowledgment component 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a first network entity in accordance with examples as disclosed herein. The reporting component 625 may be configured as or otherwise support a means for receiving, from a first UE, a first message including a measurement report indicating a degradation of communications between the first UE and the first network entity. The connection request component 630 may be configured as or otherwise support a means for transmitting, to a second network entity, a second message for switching a connection between the first UE and the first network entity to a connection between the first UE and the second network entity based on receiving the measurement report indicating the degradation of communications, the second message indicating a set of identifiers including at least a first identifier associated with the first UE and a second identifier associated with a second UE, where the first network entity is associated with a first CU and the second network entity is associated with a second CU different from the first CU. The connection switching component 635 may be configured as or otherwise support a means for transmitting, to the first UE, a third message indicating a third identifier associated with the first UE and the second identifier associated with the second UE, where the third identifier associated with the first UE is based on an assignment of the first UE at the second network entity, the assignment of the third identifier to the first UE being in accordance with a relay connection establishment between the first UE, the second UE, and the second network entity as part of switching the connection between the first UE and the first network entity to the connection between the first UE and the second network entity.

Additionally, or alternatively, the communications manager 620 may support wireless communications at a second network entity in accordance with examples as disclosed herein. The connection request component 630 may be configured as or otherwise support a means for receiving, from a first network entity, a first message for switching a connection between a first UE and the first network entity to a connection between the first UE and the second network entity, the first message indicating a set of identifiers including at least a first identifier associated with the first UE and a second identifier associated with a second UE, where the first network entity is associated with a first CU and the second network entity is associated with a second CU different from the first CU. The connection acknowledgment component 640 may be configured as or otherwise support a means for transmitting, to the first network entity, a second message indicating the first identifier associated with the first UE, the second identifier associated with the second UE, and a third identifier associated with the first UE, where the third identifier associated with the first UE is based on an assignment of the first UE at the second network entity, the assignment of the third identifier to the first UE being in accordance with a relay connection establishment between the first UE, the second UE, and the second network entity as part of switching the connection between the first UE and the first network entity to the connection between the first UE and the second network entity. The connection switching component 635 may be configured as or otherwise support a means for communicating with the first UE via the second UE based on transmitting the second message.

Figure 7:
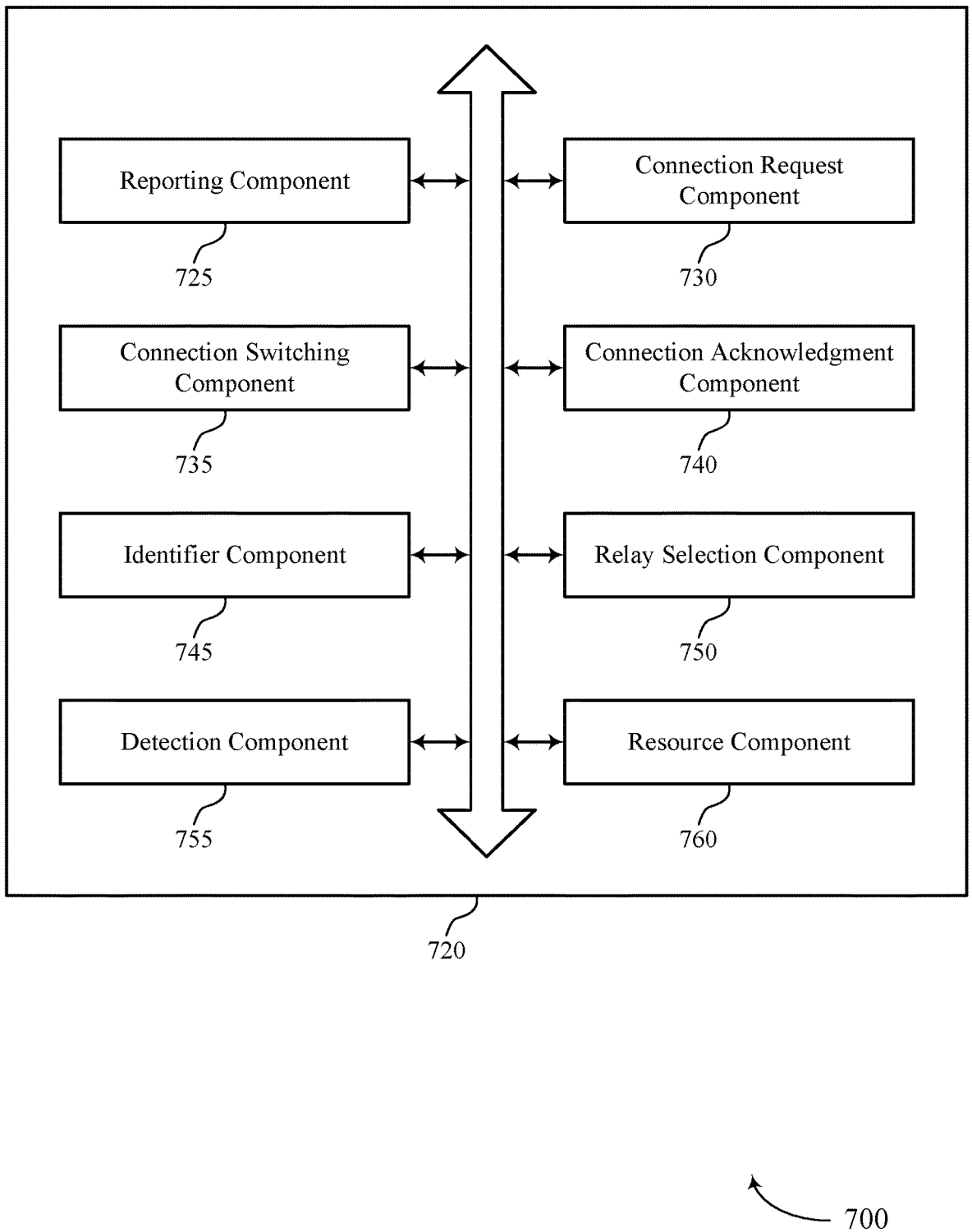
FIG. 7 shows a block diagram of a communications manager that supports network coordination during path switching and multi-path scenarios in accordance with one or more aspects of the present disclosure.

FIG. 7 shows a block diagram 700 of a communications manager 720 that supports network coordination during path switching and multi-path scenarios in accordance with one or more aspects of the present disclosure. The communications manager 720 may be an example of aspects of a communications manager 520, a communications manager 620, or both, as described herein. The communications manager 720, or various components thereof, may be an example of means for performing various aspects of network coordination during path switching and multi-path scenarios as described herein. For example, the communications manager 720 may include a reporting component 725, a connection request component 730, a connection switching component 735, a connection acknowledgment component 740, an identifier component 745, a relay selection component 750, a detection component 755, a resource component 760, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communications at a first network entity in accordance with examples as disclosed herein. The reporting component 725 may be configured as or otherwise support a means for receiving, from a first UE, a first message including a measurement report indicating a degradation of communications between the first UE and the first network entity. The connection request component 730 may be configured as or otherwise support a means for transmitting, to a second network entity, a second message for switching a connection between the first UE and the first network entity to a connection between the first UE and the second network entity based on receiving the measurement report indicating the degradation of communications, the second message indicating a set of identifiers including at least a first identifier associated with the first UE and a second identifier associated with a second UE, where the first network entity is associated with a first CU and the second network entity is associated with a second CU different from the first CU. The connection switching component 735 may be configured as or otherwise support a means for transmitting, to the first UE, a third message indicating a third identifier associated with the first UE and the second identifier associated with the second UE, where the third identifier associated with the first UE is based on an assignment of the first UE at the second network entity, the assignment of the third identifier to the first UE being in accordance with a relay connection establishment between the first UE, the second UE, and the second network entity as part of switching the connection between the first UE and the first network entity to the connection between the first UE and the second network entity.

In some examples, the connection acknowledgment component 740 may be configured as or otherwise support a means for receiving, from the second network entity and in response to transmitting the second message, a fourth message acknowledging the second message, the fourth message indicating the first identifier associated with the first UE, the second identifier associated with the second UE, and the third identifier associated with the first UE.

In some examples, to support receiving the fourth message, the resource component 760 may be configured as or otherwise support a means for receiving an indication of sidelink control group resources associated with the relay connection between the first UE, the second UE, and the second network entity, where the third message includes the indication of the sidelink control group resources.

In some examples, to support receiving the first message including the measurement report, the connection switching component 735 may be configured as or otherwise support a means for receiving the first message from the first UE via a third UE, where switching the connection between the first UE and the first network entity to the connection between the first UE and the second network entity includes switching a second relay connection between the first UE, the third UE, and the first network entity to the relay connection between the first UE, the second UE, and the second network entity.

In some examples, to support receiving the first message, the identifier component 745 may be configured as or otherwise support a means for receiving an indication of the set of identifiers associated with a set of multiple UEs, where the set of multiple UEs are associated with respective candidate relay connections between the first UE and the second network entity.

In some examples, the identifier component 745 may be configured as or otherwise support a means for transmitting, to the second network entity, a fourth identifier associated with the first UE, where the fourth identifier associated with the first UE is based on updating the first identifier associated with the first UE.

In some examples, the first network entity includes a source network node for a handover operation and the second network entity includes a target network node for the handover operation.

Additionally, or alternatively, the communications manager 720 may support wireless communications at a second network entity in accordance with examples as disclosed herein. In some examples, the connection request component 730 may be configured as or otherwise support a means for receiving, from a first network entity, a first message for switching a connection between a first UE and the first network entity to a connection between the first UE and the second network entity, the first message indicating a set of identifiers including at least a first identifier associated with the first UE and a second identifier associated with a second UE, where the first network entity is associated with a first CU and the second network entity is associated with a second CU different from the first CU. The connection acknowledgment component 740 may be configured as or otherwise support a means for transmitting, to the first network entity, a second message indicating the first identifier associated with the first UE, the second identifier associated with the second UE, and a third identifier associated with the first UE, where the third identifier associated with the first UE is based on an assignment of the first UE at the second network entity, the assignment of the third identifier to the first UE being in accordance with a relay connection establishment between the first UE, the second UE, and the second network entity as part of switching the connection between the first UE and the first network entity to the connection between the first UE and the second network entity. In some examples, the connection switching component 735 may be configured as or otherwise support a means for communicating with the first UE via the second UE based on transmitting the second message.

In some examples, the relay selection component 750 may be configured as or otherwise support a means for selecting the second UE from a set of multiple UEs associated with the set of identifiers, where the set of multiple UEs are associated with respective candidate relay connections between the first UE and the second network entity.

In some examples, the connection switching component 735 may be configured as or otherwise support a means for transmitting, to the second UE, a third message indicating the first identifier associated with the first UE and the third identifier associated with the first UE, where establishing the relay connection between the first UE, the second UE, and the second network entity as part of switching the connection between the first UE and the first network entity to the connection between the first UE and the second network entity is based on the third message.

In some examples, the identifier component 745 may be configured as or otherwise support a means for receiving, from the second UE, a request for the third identifier associated with the first UE, where receiving the request is based on the second UE being in an inactive mode or an idle mode.

In some examples, the detection component 755 may be configured as or otherwise support a means for detecting an operational state of the second UE, where establishing the relay connection between the first UE, the second UE, and the second network entity as part of switching the connection between the first UE and the first network entity to the connection between the first UE and the second network entity is based on the operational state of the second UE.

In some examples, the operational state of the second UE is associated with an active mode, an inactive mode, or an idle mode.

In some examples, the identifier component 745 may be configured as or otherwise support a means for receiving, from the first network entity, a fourth identifier associated with the first UE, where the fourth identifier associated with the first UE is based on updating the first identifier associated with the first UE.

In some examples, to support transmitting the second message, the resource component 760 may be configured as or otherwise support a means for transmitting an indication of sidelink control group resources associated with the relay connection between the first UE, the second UE, and the second network entity.

Figure 8:
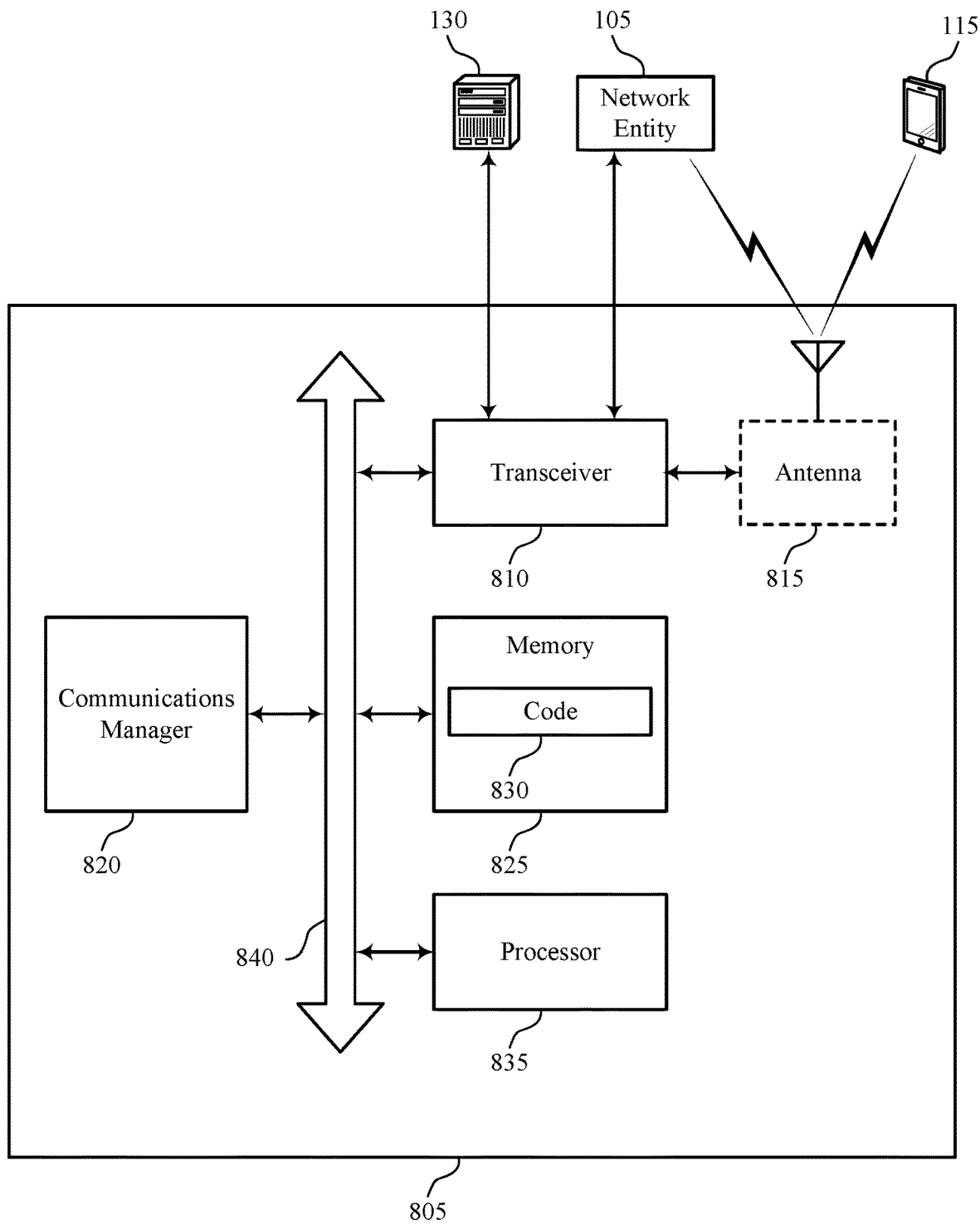
FIG. 8 shows a diagram of a system including a device that supports network coordination during path switching and multi-path scenarios in accordance with one or more aspects of the present disclosure.

FIG. 8 shows a diagram of a system 800 including a device 805 that supports network coordination during path switching and multi-path scenarios in accordance with one or more aspects of the present disclosure. The device 805 may be an example of or include the components of a device 505, a device 605, or a network entity 105 as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. The transceiver 810, or the transceiver 810 and one or more antennas 815 or wired interfaces, where applicable, may be an example of a transmitter 515, a transmitter 615, a receiver 510, a receiver 610, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some cases, the code 830 may not be directly executable by the processor 835 but may cause a computer (e.g., when compiled and executed) to perform functions described herein. In some cases, the memory 825 may contain, among other things, a BIOS which may control basic hardware or software operation such as the interaction with peripheral components or devices.

The processor 835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 835 may be configured to operate a memory array using a memory controller. In some other cases, a memory controller may be integrated into the processor 835. The processor 835 may be configured to execute computer-readable instructions stored in a memory (e.g., the memory 825) to cause the device 805 to perform various functions (e.g., functions or tasks supporting network coordination during path switching and multi-path scenarios). For example, the device 805 or a component of the device 805 may include a processor 835 and memory 825 coupled with the processor 835, the processor 835 and memory 825 configured to perform various functions described herein. The processor 835 may be an example of a cloud-computing platform (e.g., one or more physical nodes and supporting software such as operating systems, virtual machines, or container instances) that may host the functions (e.g., by executing code 830) to perform the functions of the device 805.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the memory 825, the code 830, and the processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with other network entities 105, and may include a controller or scheduler for controlling communications with UEs 115 in cooperation with other network entities 105. In some examples, the communications manager 820 may support an X2 interface within an LTE/LTE-A wireless communications network technology to provide communication between network entities 105.

The communications manager 820 may support wireless communications at a first network entity in accordance with examples as disclosed herein. For example, the communications manager 820 may be configured as or otherwise support a means for receiving, from a first UE, a first message including a measurement report indicating a degradation of communications between the first UE and the first network entity. The communications manager 820 may be configured as or otherwise support a means for transmitting, to a second network entity, a second message for switching a connection between the first UE and the first network entity to a connection between the first UE and the second network entity based on receiving the measurement report indicating the degradation of communications, the second message indicating a set of identifiers including at least a first identifier associated with the first UE and a second identifier associated with a second UE, where the first network entity is associated with a first CU and the second network entity is associated with a second CU different from the first CU. The communications manager 820 may be configured as or otherwise support a means for transmitting, to the first UE, a third message indicating a third identifier associated with the first UE and the second identifier associated with the second UE, where the third identifier associated with the first UE is based on an assignment of the first UE at the second network entity, the assignment of the third identifier to the first UE being in accordance with a relay connection establishment between the first UE, the second UE, and the second network entity as part of switching the connection between the first UE and the first network entity to the connection between the first UE and the second network entity.

Additionally, or alternatively, the communications manager 820 may support wireless communications at a second network entity in accordance with examples as disclosed herein. For example, the communications manager 820 may be configured as or otherwise support a means for receiving, from a first network entity, a first message for switching a connection between a first UE and the first network entity to a connection between the first UE and the second network entity, the first message indicating a set of identifiers including at least a first identifier associated with the first UE and a second identifier associated with a second UE, where the first network entity is associated with a first CU and the second network entity is associated with a second CU different from the first CU. The communications manager 820 may be configured as or otherwise support a means for transmitting, to the first network entity, a second message indicating the first identifier associated with the first UE, the second identifier associated with the second UE, and a third identifier associated with the first UE, where the third identifier associated with the first UE is based on an assignment of the first UE at the second network entity, the assignment of the third identifier to the first UE being in accordance with a relay connection establishment between the first UE, the second UE, and the second network entity as part of switching the connection between the first UE and the first network entity to the connection between the first UE and the second network entity. The communications manager 820 may be configured as or otherwise support a means for communicating with the first UE via the second UE based on transmitting the second message.

By including or configuring the communications manager 820 in accordance with examples as described herein, the device 805 may support techniques for network coordination during path switching and multi-path scenarios which may result in improved communication reliability, reduced latency, improved user experience related to reduced processing, reduced power consumption, more efficient utilization of communication resources, improved coordination between devices, longer battery life, and improved utilization of processing capability, among other advantages.

In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described with reference to the communications manager 820 may be supported by or performed by the processor 835, the memory 825, the code 830, the transceiver 810, or any combination thereof. For example, the code 830 may include instructions executable by the processor 835 to cause the device 805 to perform various aspects of network coordination during path switching and multi-path scenarios as described herein, or the processor 835 and the memory 825 may be otherwise configured to perform or support such operations.

Figure 9:
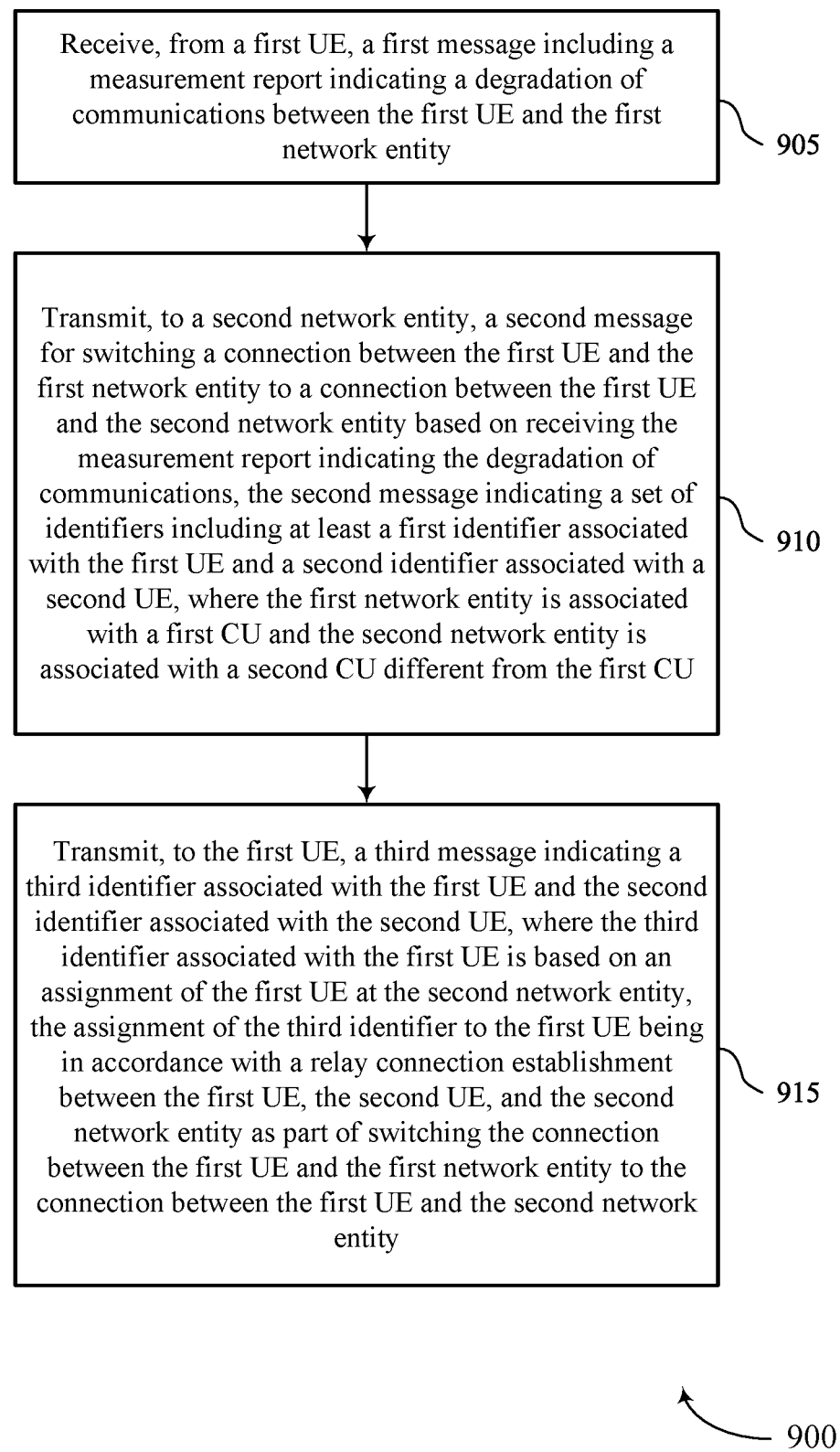
FIGS. 9 through 12 show flowcharts illustrating methods that support network coordination during path switching and multi-path scenarios in accordance with one or more aspects of the present disclosure.

FIG. 9 shows a flowchart illustrating a method 900 that supports network coordination during path switching and multi-path scenarios in accordance with one or more aspects of the present disclosure. The operations of the method 900 may be implemented by a network entity or its components as described herein. For example, the operations of the method 900 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 905, the method may include receiving, from a first UE, a first message including a measurement report indicating a degradation of communications between the first UE and the first network entity. The operations of 905 may be performed in accordance with examples as disclosed herein. In some examples, aspects of the operations of 905 may be performed by a reporting component 725 as described with reference to FIG. 7.

At 910, the method may include transmitting, to a second network entity, a second message for switching a connection between the first UE and the first network entity to a connection between the first UE and the second network entity based on receiving the measurement report indicating the degradation of communications, the second message indicating a set of identifiers including at least a first identifier associated with the first UE and a second identifier associated with a second UE, where the first network entity is associated with a first CU and the second network entity is associated with a second CU different from the first CU. The operations of 910 may be performed in accordance with examples as disclosed herein. In some examples, aspects of the operations of 910 may be performed by a connection request component 730 as described with reference to FIG. 7.

At 915, the method may include transmitting, to the first UE, a third message indicating a third identifier associated with the first UE and the second identifier associated with the second UE, where the third identifier associated with the first UE is based on an assignment of the first UE at the second network entity, the assignment of the third identifier to the first UE being in accordance with a relay connection establishment between the first UE, the second UE, and the second network entity as part of switching the connection between the first UE and the first network entity to the connection between the first UE and the second network entity. The operations of 915 may be performed in accordance with examples as disclosed herein. In some examples, aspects of the operations of 915 may be performed by a connection switching component 735 as described with reference to FIG. 7.

Figure 10:
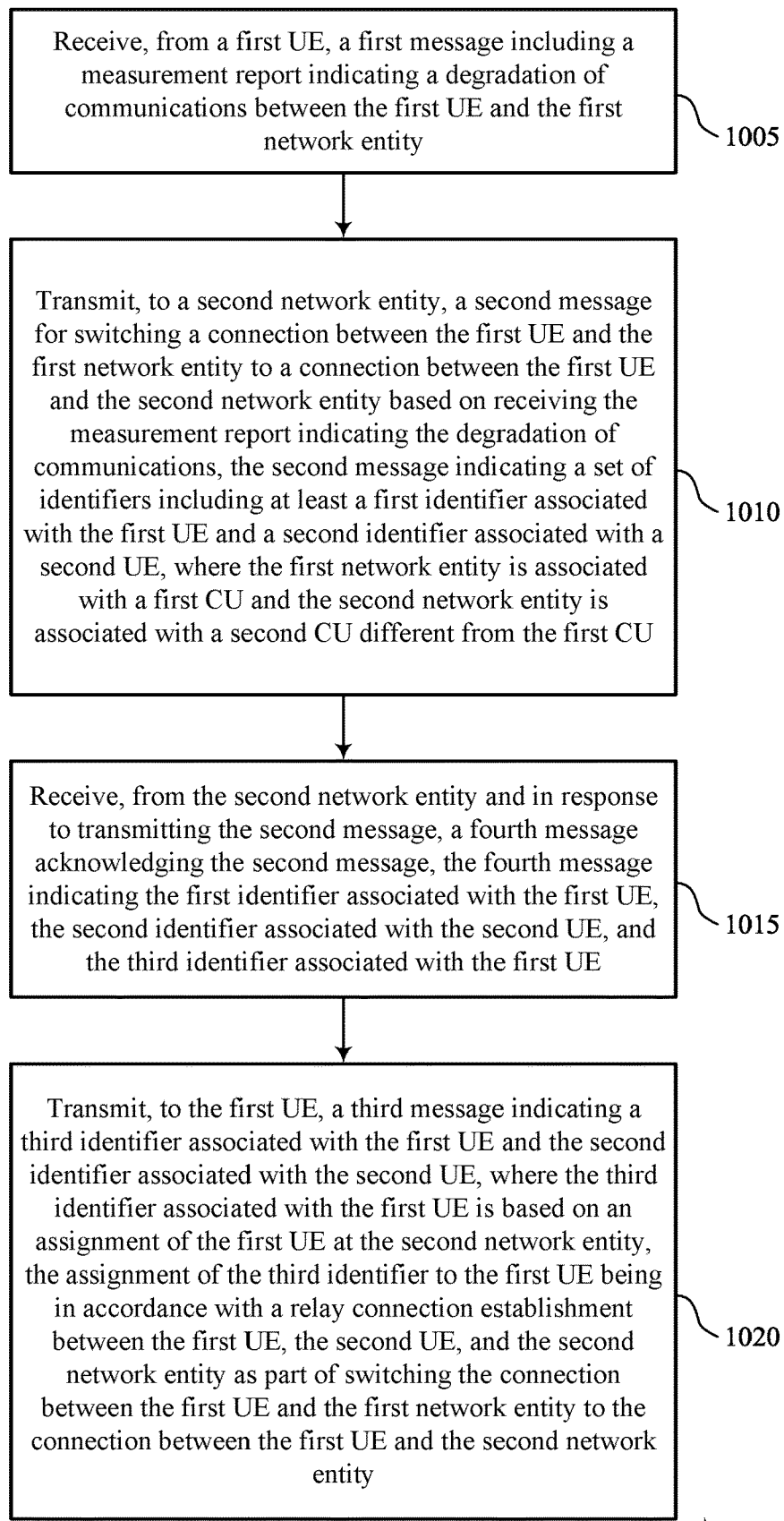

FIG. 10 shows a flowchart illustrating a method 1000 that supports network coordination during path switching and multi-path scenarios in accordance with one or more aspects of the present disclosure. The operations of the method 1000 may be implemented by a network entity or its components as described herein. For example, the operations of the method 1000 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1005, the method may include receiving, from a first UE, a first message including a measurement report indicating a degradation of communications between the first UE and the first network entity. The operations of 1005 may be performed in accordance with examples as disclosed herein. In some examples, aspects of the operations of 1005 may be performed by a reporting component 725 as described with reference to FIG. 7.

At 1010, the method may include transmitting, to a second network entity, a second message for switching a connection between the first UE and the first network entity to a connection between the first UE and the second network entity based on receiving the measurement report indicating the degradation of communications, the second message indicating a set of identifiers including at least a first identifier associated with the first UE and a second identifier associated with a second UE, where the first network entity is associated with a first CU and the second network entity is associated with a second CU different from the first CU. The operations of 1010 may be performed in accordance with examples as disclosed herein. In some examples, aspects of the operations of 1010 may be performed by a connection request component 730 as described with reference to FIG. 7.

At 1015, the method may include receiving, from the second network entity and in response to transmitting the second message, a fourth message acknowledging the second message, the fourth message indicating the first identifier associated with the first UE, the second identifier associated with the second UE, and the third identifier associated with the first UE. The operations of 1015 may be performed in accordance with examples as disclosed herein. In some examples, aspects of the operations of 1015 may be performed by a connection acknowledgment component 740 as described with reference to FIG. 7.

At 1020, the method may include transmitting, to the first UE, a third message indicating a third identifier associated with the first UE and the second identifier associated with the second UE, where the third identifier associated with the first UE is based on an assignment of the first UE at the second network entity, the assignment of the third identifier to the first UE being in accordance with a relay connection establishment between the first UE, the second UE, and the second network entity as part of switching the connection between the first UE and the first network entity to the connection between the first UE and the second network entity. The operations of 1020 may be performed in accordance with examples as disclosed herein. In some examples, aspects of the operations of 1020 may be performed by a connection switching component 735 as described with reference to FIG. 7.

Figure 11:
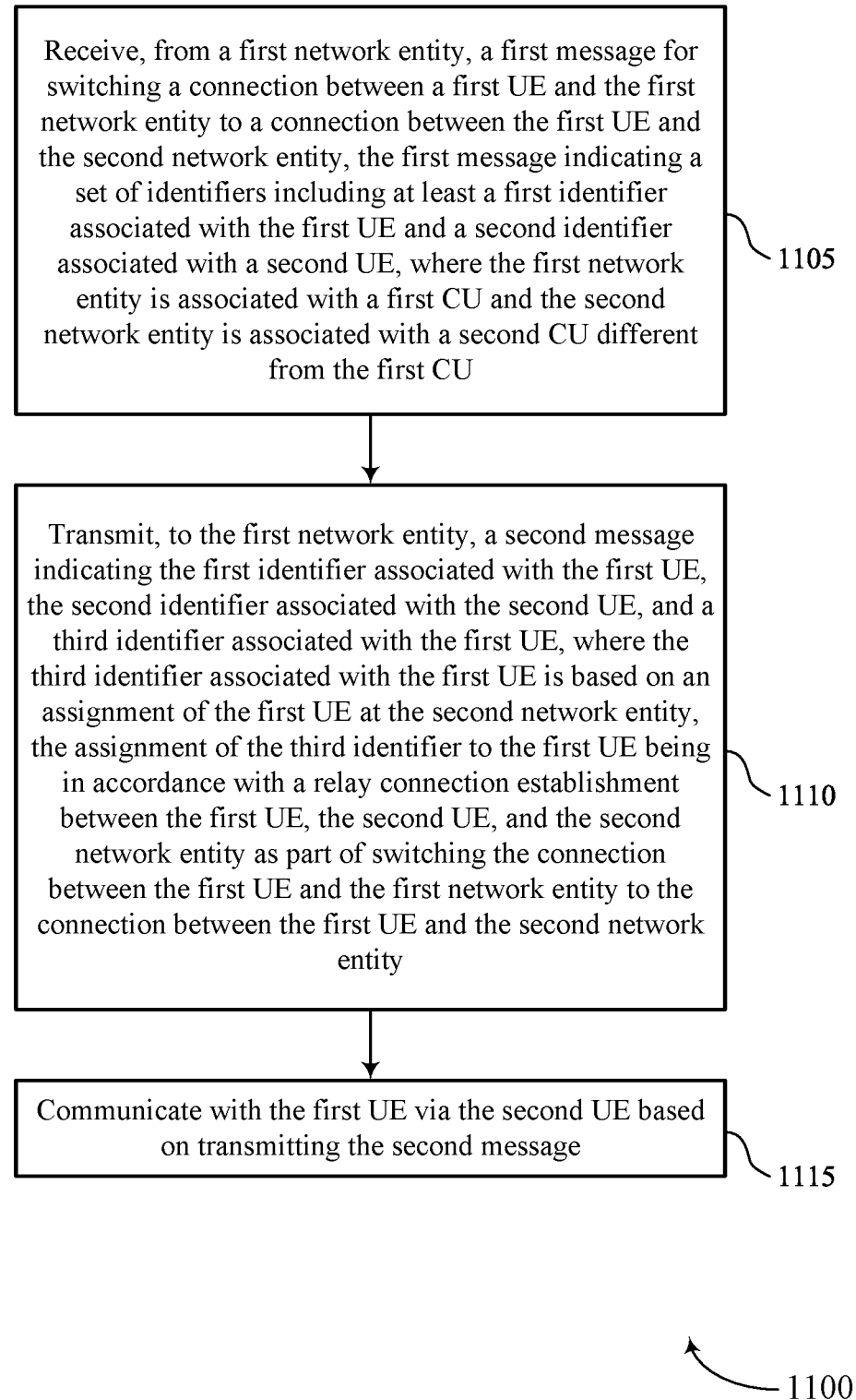

FIG. 11 shows a flowchart illustrating a method 1100 that supports network coordination during path switching and multi-path scenarios in accordance with one or more aspects of the present disclosure. The operations of the method 1100 may be implemented by a network entity or its components as described herein. For example, the operations of the method 1100 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1105, the method may include receiving, from a first network entity, a first message for switching a connection between a first UE and the first network entity to a connection between the first UE and the second network entity, the first message indicating a set of identifiers including at least a first identifier associated with the first UE and a second identifier associated with a second UE, where the first network entity is associated with a first CU and the second network entity is associated with a second CU different from the first CU. The operations of 1105 may be performed in accordance with examples as disclosed herein. In some examples, aspects of the operations of 1105 may be performed by a connection request component 730 as described with reference to FIG. 7.

At 1110, the method may include transmitting, to the first network entity, a second message indicating the first identifier associated with the first UE, the second identifier associated with the second UE, and a third identifier associated with the first UE, where the third identifier associated with the first UE is based on an assignment of the first UE at the second network entity, the assignment of the third identifier to the first UE being in accordance with a relay connection establishment between the first UE, the second UE, and the second network entity as part of switching the connection between the first UE and the first network entity to the connection between the first UE and the second network entity. The operations of 1110 may be performed in accordance with examples as disclosed herein. In some examples, aspects of the operations of 1110 may be performed by a connection acknowledgment component 740 as described with reference to FIG. 7.

At 1115, the method may include communicating with the first UE via the second UE based on transmitting the second message. The operations of 1115 may be performed in accordance with examples as disclosed herein. In some examples, aspects of the operations of 1115 may be performed by a connection switching component 735 as described with reference to FIG. 7.

Figure 12:
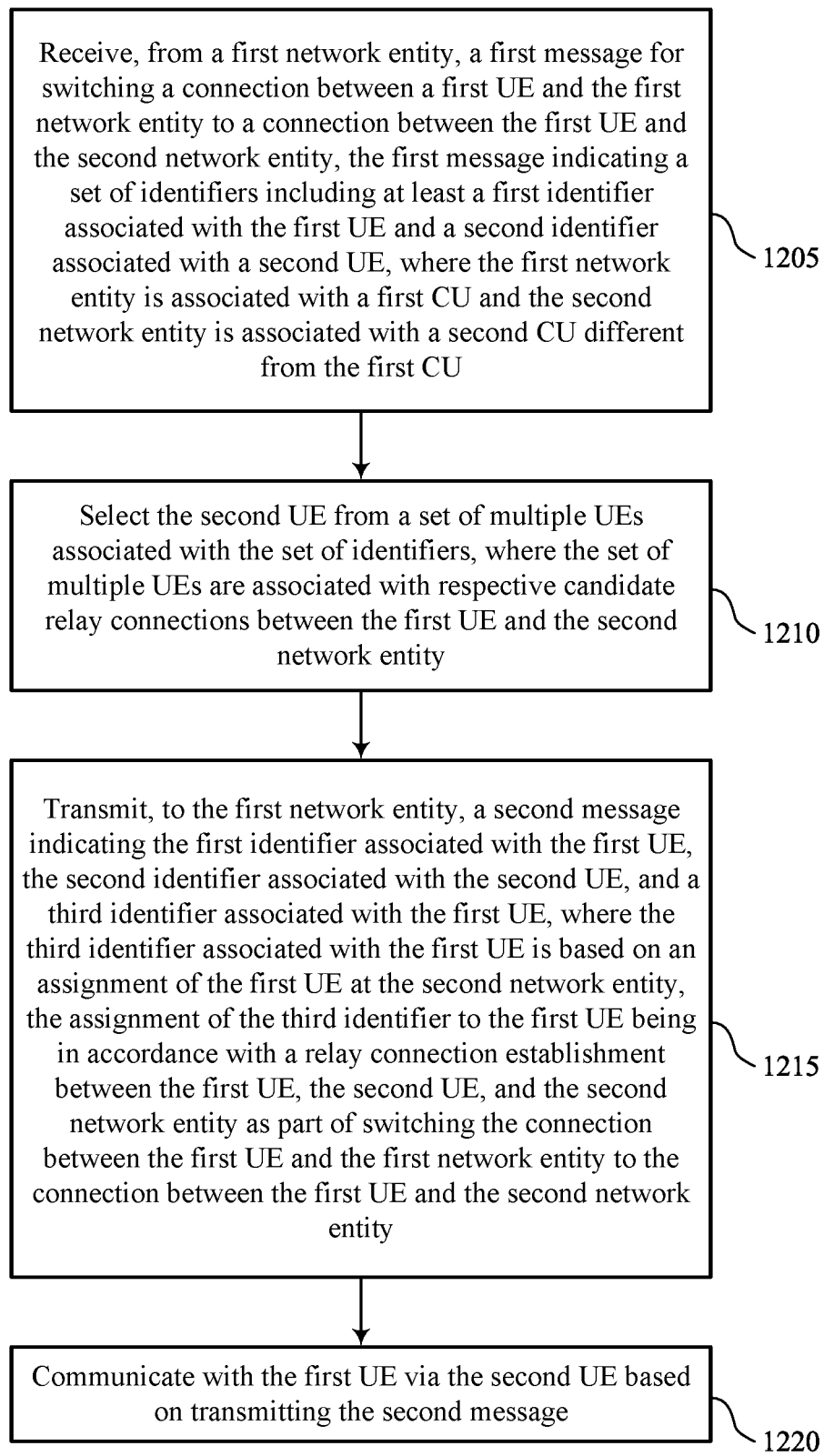

FIG. 12 shows a flowchart illustrating a method 1200 that supports network coordination during path switching and multi-path scenarios in accordance with one or more aspects of the present disclosure. The operations of the method 1200 may be implemented by a network entity or its components as described herein. For example, the operations of the method 1200 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1205, the method may include receiving, from a first network entity, a first message for switching a connection between a first UE and the first network entity to a connection between the first UE and the second network entity, the first message indicating a set of identifiers including at least a first identifier associated with the first UE and a second identifier associated with a second UE, where the first network entity is associated with a first CU and the second network entity is associated with a second CU different from the first CU. The operations of 1205 may be performed in accordance with examples as disclosed herein. In some examples, aspects of the operations of 1205 may be performed by a connection request component 730 as described with reference to FIG. 7.

At 1210, the method may include selecting the second UE from a set of multiple UEs associated with the set of identifiers, where the set of multiple UEs are associated with respective candidate relay connections between the first UE and the second network entity. The operations of 1210 may be performed in accordance with examples as disclosed herein. In some examples, aspects of the operations of 1210 may be performed by a relay selection component 750 as described with reference to FIG. 7.

At 1215, the method may include transmitting, to the first network entity, a second message indicating the first identifier associated with the first UE, the second identifier associated with the second UE, and a third identifier associated with the first UE, where the third identifier associated with the first UE is based on an assignment of the first UE at the second network entity, the assignment of the third identifier to the first UE being in accordance with a relay connection establishment between the first UE, the second UE, and the second network entity as part of switching the connection between the first UE and the first network entity to the connection between the first UE and the second network entity. The operations of 1215 may be performed in accordance with examples as disclosed herein. In some examples, aspects of the operations of 1215 may be performed by a connection acknowledgment component 740 as described with reference to FIG. 7.

At 1220, the method may include communicating with the first UE via the second UE based on transmitting the second message. The operations of 1220 may be performed in accordance with examples as disclosed herein. In some examples, aspects of the operations of 1220 may be performed by a connection switching component 735 as described with reference to FIG. 7.

The following provides an overview of aspects of the present disclosure:

Aspect 1: A method for wireless communications at a first network entity, comprising: receiving, from a first UE, a first message comprising a measurement report indicating a degradation of communications between the first UE and the first network entity; transmitting, to a second network entity, a second message for switching a connection between the first UE and the first network entity to a connection between the first UE and the second network entity based at least in part on receiving the measurement report indicating the degradation of communications, the second message indicating a set of identifiers including at least a first identifier associated with the first UE and a second identifier associated with a second UE, wherein the first network entity is associated with a first central unit and the second network entity is associated with a second central unit different from the first central unit; and transmitting, to the first UE, a third message indicating a third identifier associated with the first UE and the second identifier associated with the second UE, wherein the third identifier associated with the first UE is based at least in part on an assignment of the first UE at the second network entity, the assignment of the third identifier to the first UE being in accordance with a relay connection establishment between the first UE, the second UE, and the second network entity as part of the switching the connection between the first UE and the first network entity to the connection between the first UE and the second network entity.

Aspect 2: The method of aspect 1, further comprising: receiving, from the second network entity and in response to transmitting the second message, a fourth message acknowledging the second message, the fourth message indicating the first identifier associated with the first UE, the second identifier associated with the second UE, and the third identifier associated with the first UE.

Aspect 3: The method of aspect 2, wherein receiving the fourth message comprises: receiving an indication of sidelink control group resources associated with the relay connection between the first UE, the second UE, and the second network entity, wherein the third message comprises the indication of the sidelink control group resources.

Aspect 4: The method of any of aspects 1 through 3, wherein receiving the first message comprising the measurement report comprises: receiving the first message from the first UE via a third UE, wherein switching the connection between the first UE and the first network entity to the connection between the first UE and the second network entity comprises switching a second relay connection between the first UE, the third UE, and the first network entity to the relay connection between the first UE, the second UE, and the second network entity.

Aspect 5: The method of any of aspects 1 through 4, wherein receiving the first message comprises: receiving an indication of the set of identifiers associated with a plurality of UEs, wherein the plurality of UEs are associated with respective candidate relay connections between the first UE and the second network entity.

Aspect 6: The method of any of aspects 1 through 5, further comprising: transmitting, to the second network entity, a fourth identifier associated with the first UE, wherein the fourth identifier associated with the first UE is based at least in part on updating the first identifier associated with the first UE.

Aspect 7: The method of any of aspects 1 through 6, wherein the first network entity comprises a source network node for a handover operation and the second network entity comprises a target network node for the handover operation.

Aspect 8: A method for wireless communications at a second network entity, comprising: receiving, from a first network entity, a first message for switching a connection between a first UE and the first network entity to a connection between the first UE and the second network entity, the first message indicating a set of identifiers including at least a first identifier associated with the first UE and a second identifier associated with a second UE, wherein the first network entity is associated with a first central unit and the second network entity is associated with a second central unit different from the first central unit; transmitting, to the first network entity, a second message indicating the first identifier associated with the first UE, the second identifier associated with the second UE, and a third identifier associated with the first UE, wherein the third identifier associated with the first UE is based at least in part on an assignment of the first UE at the second network entity, the assignment of the third identifier to the first UE being in accordance with a relay connection establishment between the first UE, the second UE, and the second network entity as part of the switching the connection between the first UE and the first network entity to the connection between the first UE and the second network entity; and communicating with the first UE via the second UE based at least in part on transmitting the second message.

Aspect 9: The method of aspect 8, further comprising: selecting the second UE from a plurality of UEs associated with the set of identifiers, wherein the plurality of UEs are associated with respective candidate relay connections between the first UE and the second network entity.

Aspect 10: The method of any of aspects 8 through 9, further comprising: transmitting, to the second UE, a third message indicating the first identifier associated with the first UE and the third identifier associated with the first UE, wherein establishing the relay connection between the first UE, the second UE, and the second network entity as part of the switching the connection between the first UE and the first network entity to the connection between the first UE and the second network entity is based at least in part on the third message.

Aspect 11: The method of aspect 10, further comprising: receiving, from the second UE, a request for the third identifier associated with the first UE, wherein receiving the request is based at least in part on the second UE being in an inactive mode or an idle mode.

Aspect 12: The method of any of aspects 8 through 11, further comprising: detecting an operational state of the second UE, wherein establishing the relay connection between the first UE, the second UE, and the second network entity as part of the switching the connection between the first UE and the first network entity to the connection between the first UE and the second network entity is based at least in part on the operational state of the second UE.

Aspect 13: The method of aspect 12, wherein the operational state of the second UE is associated with an active mode, an inactive mode, or an idle mode.

Aspect 14: The method of any of aspects 8 through 13, further comprising: receiving, from the first network entity, a fourth identifier associated with the first UE, wherein the fourth identifier associated with the first UE is based at least in part on updating the first identifier associated with the first UE.

Aspect 15: The method of any of aspects 8 through 14, wherein transmitting the second message comprises: transmitting an indication of sidelink control group resources associated with the relay connection between the first UE, the second UE, and the second network entity.

Aspect 16: An apparatus for wireless communications at a first network entity, comprising a processor; memory coupled with the processor; and instructions stored in the memory and executable by the processor to cause the apparatus to perform a method of any of aspects 1 through 7.

Aspect 17: An apparatus for wireless communications at a first network entity, comprising at least one means for performing a method of any of aspects 1 through 7.

Aspect 18: A non-transitory computer-readable medium storing code for wireless communications at a first network entity, the code comprising instructions executable by a processor to perform a method of any of aspects 1 through 7.

Aspect 19: An apparatus for wireless communications at a second network entity, comprising a processor; memory coupled with the processor; and instructions stored in the memory and executable by the processor to cause the apparatus to perform a method of any of aspects 8 through 15.

Aspect 20: An apparatus for wireless communications at a second network entity, comprising at least one means for performing a method of any of aspects 8 through 15.

Aspect 21: A non-transitory computer-readable medium storing code for wireless communications at a second network entity, the code comprising instructions executable by a processor to perform a method of any of aspects 8 through 15.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first network entity, comprising:
   receiving, from a first user equipment (UE), a first message comprising a measurement report indicating a degradation of communications between the first UE and the first network entity;
   transmitting, to a second network entity, a second message for switching a connection between the first UE and the first network entity to a connection between the first UE and the second network entity based at least in part on receiving the measurement report indicating the degradation of communications, the second message indicating a set of identifiers including at least a first layer-2 identifier associated with the first UE and a plurality of layer-2 identifiers associated with a plurality of relay UEs, wherein the first network entity is associated with a first central unit and the second network entity is associated with a second central unit different from the first central unit; and
   transmitting, to the first UE, a third message indicating a local identifier associated with the first UE and a second layer-2 identifier, from the plurality of layer-2 identifiers, associated with a second UE selected by the second network entity from the plurality of relay UEs, wherein the local identifier associated with the first UE is based at least in part on an assignment of the first UE at the second network entity, the assignment of the local identifier to the first UE being in accordance with a relay connection between the first UE, the second UE, and the second network entity as part of switching the connection between the first UE and the first network entity to the connection between the first UE and the second network entity.

2. The method of claim 1, further comprising:
   receiving, from the second network entity and in response to transmitting the second message, a fourth message acknowledging the second message, the fourth message indicating the first layer-2 identifier associated with the first UE, the second layer-2 identifier associated with the second UE, and the local identifier associated with the first UE.

3. The method of claim 2, wherein receiving the fourth message comprises:
   receiving an indication of sidelink control group resources associated with the relay connection between the first UE, the second UE, and the second network entity, wherein the third message comprises the indication of the sidelink control group resources.

4. The method of claim 1, wherein receiving the first message comprising the measurement report comprises:
   receiving the first message from the first UE via a third UE, wherein switching the connection between the first UE and the first network entity to the connection between the first UE and the second network entity comprises switching a second relay connection between the first UE, the third UE, and the first network entity to the relay connection between the first UE, the second UE, and the second network entity.

5. The method of claim 1, wherein receiving the first message comprises:
   receiving, from the first UE, an indication of the plurality of layer-2 identifiers associated with the plurality of relay UEs, including at least the second UE, wherein the plurality of relay UEs are associated with respective candidate relay connections between the first UE and the second network entity.

6. The method of claim 5, further comprising:
   receiving, from the second network entity in response to the second message, a fourth message indicative of the local identifier assigned to the first UE and indicative of the second layer-2 identifier from the plurality of layer-2 identifiers, wherein transmission of the third message is based at least in part on reception of the fourth message.

7. The method of claim 1, further comprising:
   transmitting, to the second network entity, a fourth identifier associated with the first UE, wherein the fourth identifier associated with the first UE is based at least in part on updating the first layer-2 identifier associated with the first UE.

8. The method of claim 1, wherein the first network entity comprises a source network node for a handover operation and the second network entity comprises a target network node for the handover operation.

9. An apparatus for wireless communications at a first network entity, comprising:
   a processor;
   memory coupled with the processor; and
   instructions stored in the memory and executable by the processor to cause the apparatus to:
   receive, from a first user equipment (UE), a first message comprising a measurement report indicating a degradation of communications between the first UE and the first network entity;
   transmit, to a second network entity, a second message for switching a connection between the first UE and the first network entity to a connection between the first UE and the second network entity based at least in part on receiving the measurement report indicating the degradation of communications, the second message indicating a set of identifiers including at least a first layer-2 identifier associated with the first UE and a plurality of layer-2 identifiers associated with a plurality of relay UEs, wherein the first network entity is associated with a first central unit and the second network entity is associated with a second central unit different from the first central unit; and
   transmit, to the first UE, a third message indicating a local identifier associated with the first UE and a second layer-2 identifier, from the plurality of layer-2 identifiers, associated with a second UE selected by the second network entity from the plurality of relay UEs, wherein the local identifier associated with the first UE is based at least in part on an assignment of the first UE at the second network entity, the assignment of the local identifier to the first UE being in accordance with a relay connection between the first UE, the second UE, and the second network entity as part of switching the connection between the first UE and the first network entity to the connection between the first UE and the second network entity.

10. The apparatus of claim 9, wherein the instructions are further executable by the processor to cause the apparatus to:
receive, from the second network entity and in response to transmitting the second message, a fourth message acknowledging the second message, the fourth message indicating the first layer-2 identifier associated with the first UE, the second layer-2 identifier associated with the second UE, and the local identifier associated with the first UE.

11. The apparatus of claim 10, wherein the instructions to receive the fourth message are executable by the processor to cause the apparatus to:
receive an indication of sidelink control group resources associated with the relay connection between the first UE, the second UE, and the second network entity, wherein the third message comprises the indication of the sidelink control group resources.

12. The apparatus of claim 9, wherein the instructions to receive the first message comprising the measurement report are executable by the processor to cause the apparatus to:
receive the first message from the first UE via a third UE, wherein switching the connection between the first UE and the first network entity to the connection between the first UE and the second network entity comprises switching a second relay connection between the first UE, the third UE, and the first network entity to the relay connection between the first UE, the second UE, and the second network entity.

13. The apparatus of claim 9, wherein the instructions to receive the first message are executable by the processor to cause the apparatus to:
receive, from the first UE, an indication of the plurality of layer-2 identifiers associated with the plurality of relay UEs, including at least the second UE, wherein the plurality of relay UEs are associated with respective candidate relay connections between the first UE and the second network entity.

14. The apparatus of claim 13, wherein the instructions are further executable by the processor to cause the apparatus to:
receive, from the second network entity in response to the second message, a fourth message indicative of the local identifier assigned to the first UE and indicative of the second layer-2 identifier from the plurality of layer-2 identifiers, wherein transmission of the third message is based at least in part on reception of the fourth message.

15. The apparatus of claim 9, wherein the instructions are further executable by the processor to cause the apparatus to:
transmit, to the second network entity, a fourth identifier associated with the first UE, wherein the fourth identifier associated with the first UE is based at least in part on updating the first layer-2 identifier associated with the first UE.

16. The apparatus of claim 9, wherein the first network entity comprises a source network node for a handover operation and the second network entity comprises a target network node for the handover operation.

* * * * *